United States Patent [19]

Li et al.

[11] Patent Number: 6,012,088

[45] Date of Patent: Jan. 4, 2000

[54] AUTOMATIC CONFIGURATION FOR INTERNET ACCESS DEVICE

[75] Inventors: Jim Y. Li; Archie L. Cobbs; Paul D. Ozzello, all of San Francisco, Calif.

[73] Assignee: International Business Machines Corporation, Armonk, N.Y.

[21] Appl. No.: 08/762,737

[22] Filed: Dec. 10, 1996

[51] Int. Cl.⁷ .................................................. G06F 13/00
[52] U.S. Cl. .......................................... 709/219; 709/220
[58] Field of Search .......................... 395/200.5, 200.51, 395/200.52, 200.55, 200.57, 200.58, 200.59, 200.6, 200.68, 200.53, 200.47, 200.49, 200.63, 200.69, 200.67; 370/402; 709/219–221; 705/26; 380/49

[56] References Cited

U.S. PATENT DOCUMENTS

| | | | |
|---|---|---|---|
| 5,150,464 | 9/1992 | Sidhu et al. | 395/200.52 |
| 5,321,840 | 6/1994 | Ahlin et al. | 395/712 |
| 5,446,897 | 8/1995 | Mathias et al. | 395/200.5 |
| 5,572,528 | 11/1996 | Shuen | 370/402 |
| 5,673,322 | 9/1997 | Pepe et al. | 380/49 |
| 5,694,546 | 12/1997 | Reisman | 705/26 |
| 5,708,780 | 1/1998 | Levergood et al. | 395/200.59 |
| 5,724,510 | 3/1998 | Arndt et al. | 395/200.5 |
| 5,734,831 | 3/1998 | Sanders | 395/200.53 |
| 5,745,699 | 4/1998 | Lynn et al. | 395/200.75 |
| 5,784,555 | 7/1998 | Stone | 709/220 |
| 5,826,000 | 10/1998 | Hamilton | 714/4 |
| 5,852,722 | 12/1998 | Hamilton | 714/4 |

FOREIGN PATENT DOCUMENTS

0791881A1  8/1997  European Pat. Off. .

OTHER PUBLICATIONS

Biagioni, Cooper, and Sansom; Designing a Practical ATM LAN, IEEE, Mar. 1993, pp. 32–39.

*Primary Examiner*—Moustafa M. Meky
*Attorney, Agent, or Firm*—Anthony N. Magistrale

[57] ABSTRACT

An Internet access device uses an automatic configuration process to handle the task of configuring the Internet access device at a customer site for communication with the Internet. Once configured, the customer has electronic mail and other access to the Internet from his local area network. A not yet configured Internet access device is shipped directly to a customer without having to be manually configured first. The customer enters a registration identification number and a telephone number onto the Internet access device. The Internet access device then automatically connects to the Internet, downloads configuration data from a configuration server containing customer site specific configuration data, and then automatically configures itself for communication with the Internet. The Internet access device is simple to install for a customer and provides valuable features such as a router, firewall, e-mail gateway, web server, and other servers. The Internet access device initially connects to the Internet through an Internet service provider over a standard analog telephone line using a standard modem and using a dynamic IP address. Once automatically configured, the Internet access device may then communicate with the Internet using any suitable connection including an analog telephone line, or a higher-speed line such as an ISDN line or a frame relay circuit and is assigned a static IP address and a range of IP addresses for other devices on its local area network.

16 Claims, 12 Drawing Sheets

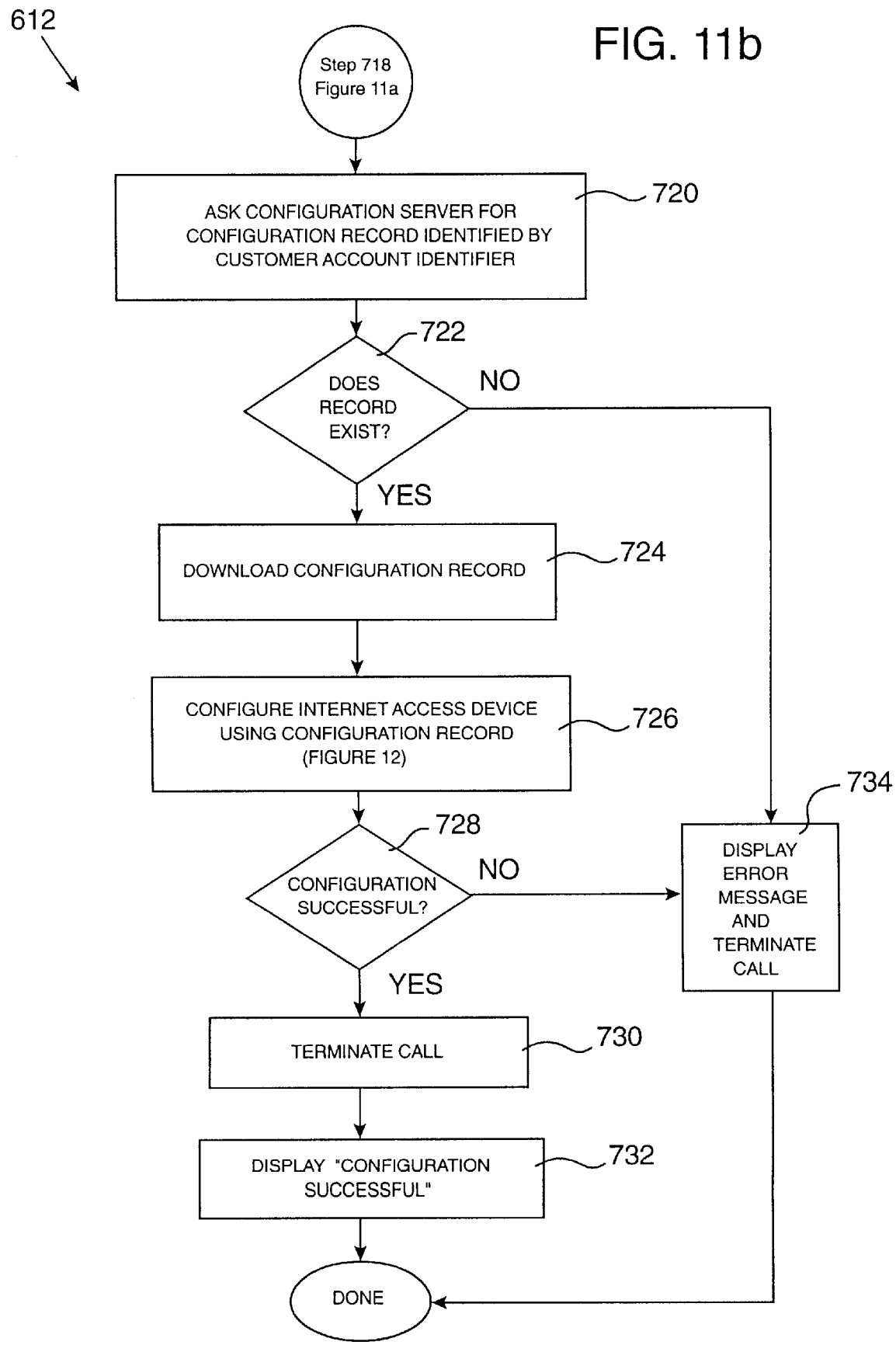

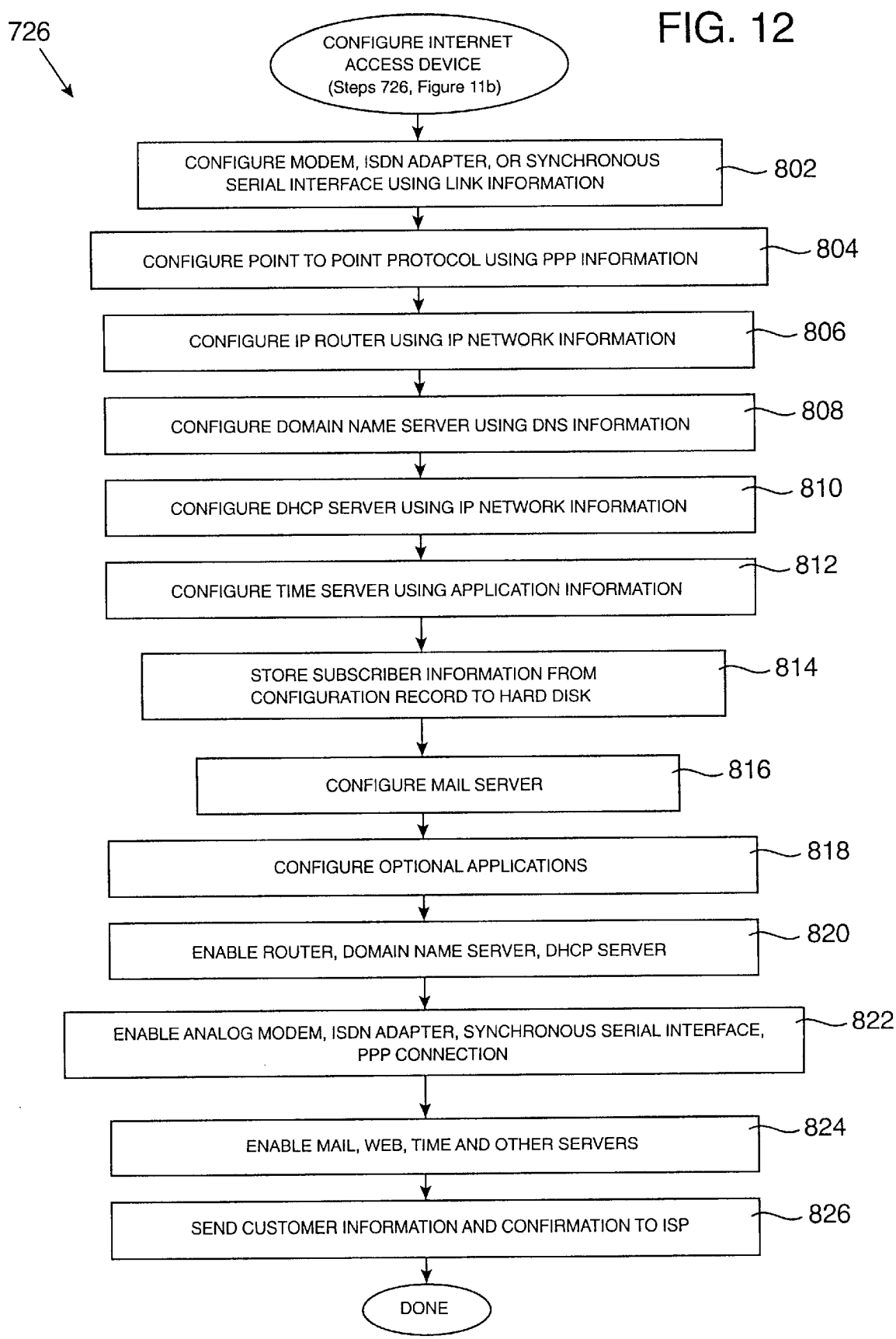

AUTOMATIC CONFIGURATION FOR INTERNET ACCESS DEVICE

CROSS REFERENCE TO RELATED APPLICATIONS

This application is related to U.S. patent application Ser. No. 08/762,736 still pending, entitled "Automatic Setup Of Services For Computer System Users", filed on the same date herewith, which is hereby incorporated by reference.

FIELD OF THE INVENTION

The present invention relates generally to computing systems and communications networks. More specifically, the present invention relates to automatically configuring a computing system for communication with a communications network.

BACKGROUND OF THE INVENTION

In recent years, the popularity of the Internet has been increasing dramatically. Every day, more and more home users, small business users and large corporations are connecting to the Internet to improve communication. The term "Internet" (upper-case "I") refers to that particular global communications network that is in use around the world and that grew out of a U.S. Department of Defense funded research project named the ARPANet. Currently, most of the Internet is commercially owned and is an extremely complex, highly redundant network of telecommunications circuits that are connected together with routers. The "Internet" refers to a particular network of communications networks, while, in general, any interconnection of networks may be termed an "internet" (lower-case "i"). The "Internet" is one example of an "internet". Currently, the Internet is used for a variety of services including communication, education, news, advertising, reference materials, broadcast like media, financial services, and other.

The Internet may be described in a very simplistic sense as follows. There are six major global telecommunications carriers each of which maintains a global telecommunications network. Examples of these global carriers are companies such as SPRINT or MCI. These global carriers have links between each of their networks to allow communication between the networks. Companies termed Internet service providers (ISPs) lease access to these global networks from one of the global carriers and provide this access to their customers such as businesses, universities and individuals. These ISPs maintain their own IP (Internet protocol) networks that are connected to the Internet. An IP network of an ISP allows an ISP to establish a presence in many different locations around the country, so that customers will have local dial-in access or a short leased-line access to the IP network. Once a customer gains access to the IP network, he or she has access to the Internet. In reality, a hierarchy of local access providers, network service providers, and network access providers provide a link from a customer to the Internet.

In general, it can be said that connecting a computer or computer network to the Internet is not a simple task. Many configuration variables must be taken into account including whether the computer is a single host at a home, or is part of a local area network (LAN) in a corporation, whether a customer desires a dynamic or static IP address, and what type of line connection the customer desires. In general, a customer connects to the Internet using either a dial-up telephone line, or a more permanent leased line connection. Most home or casual use customers connect to the Internet through a dial-up line using a modem, while corporate or heavy use customers often connect with a permanent leased line connection.

Another distinction between customers relates to the type of address on the Internet used by the customer. An IP (Internet protocol) address represents a communications end point. This may or may not correlate to a user. For example, time-sharing or multi-user systems have many users per address. Typically though, each end point will have a unique IP address (or IP number or "dotted quad"). Each IP address has four parts separated by dots, e.g., "101.100.2.2", and is a 32-bit number. A router that directs information to various end hosts has an IP address such as "101.100.2.1", where the last part will be a unique number identifying the end hosts that are attached to the router. For example, for three hosts connected to such a router, these hosts may have IP addresses of 101.100.2.2, 101.100.2.3, and 101.100.2.4.

A home or casual use customer who only dials up to connect to the Internet occasionally, may only need a dynamic or temporary address for that session only. This dynamic IP address is unique for that user for only a particular transaction. Once the user has disconnected from the Internet, the dynamic IP address may be reassigned to another user. However, providers of services or information on the Internet require a permanent or static IP address so that other users may access this information at any time using a known address. Corporate customers having a web site and a domain name may also require one or more static IP addresses. Another configuration variable is that customers may choose between a variety of types of connections to the Internet that are offered by an ISP. For example, a casual use customer may choose to use a modem on a dial-up line to access the Internet, or may choose to use an ISDN (integrated services digital network) adapter in order to access the Internet over a dial-up ISDN line. A corporate or heavy use customer may wish to utilize a permanent leased line connection to the Internet that uses frame relay technology for high-speed access.

Thus, there are complexities and difficulties involved with connecting a computer or LAN to the Internet and configuring the computer or LAN for communication with the Internet. One such difficulty is that routers both at the ISP and in the customer's computer must be configured correctly. At the ISP, a trained network operator is available for entering configuration information into the router such as the IP address of a customer, an account number, etc. Other configuration information that must be entered includes telephone numbers to dial, passwords, packet filter rules, LAN network information, domain name information, e-mail configuration, compression parameters, etc. Once this is done, however, the customer must be told of this information and then must manually enter this same information into his own networking hardware in order to configure a router, for example. This duplicity of entering information is tedious for the customer, and is prone to errors. Also, a configuration will be different depending upon whether a customer wishes to access the Internet using a modem, an ISDN line, a frame relay circuit, or other high-speed line.

Furthermore, connecting a LAN is considerably more difficult than connecting a single host as it requires the correct installation and configuration of a wide variety of interrelated systems. By way of example, routers, firewalls, DNS servers and DHCP servers, etc. must all be configured correctly before the LAN can successfully communicate with the Internet. Connecting a LAN is an all-or-nothing proposition. The minimum equipment necessary includes a firewall, router, and DNS server. Configuring this equipment correctly typically requires an IP networking engineer. This fact represents a significant obstacle to the wide adoption of Internet technologies, particularly amongst the majority of small business organizations. Internet service providers relying on the current state-of-the-art in networking equipment are unable to engage any customers but the technical elite.

Therefore, the automation of the setup of a full-service IP LAN network for communication with the Internet is desirable. It would further be desirable to have an Internet access device and configuration process for configuring a computer system to communicate with the Internet that is not prone to error and that is secure. It would be further desirable for this configuration process to be automatic, and for the configuration process to be able to use the existing infrastructure of the Internet in order to retrieve configuration data from any location. It would further be desirable if a customer need only perform a minimum of tasks and need only enter a minimum of information into such an Internet access device in order for that device to be automatically configured for communication with the Internet.

SUMMARY OF THE INVENTION

To achieve the foregoing and other objects and in accordance with the purpose of the present invention, an Internet access device is disclosed that uses an automatic configuration process to handle the task of configuring the Internet access device at a customer site. This process allows a not yet configured Internet access device to be shipped directly to a customer without having to be manually configured first. In some embodiments, the customer simply enters a registration identification number and a telephone number onto the front panel of the Internet access device. The Internet access device then automatically connects to the Internet, downloads configuration data from a configuration server containing customer site specific configuration data, and then automatically configures itself for communication with the Internet.

In one embodiment, an Internet access device is a communications apparatus with at least two physical interfaces for connecting a LAN to the Internet over a wide area communications link. In addition to routing network data, an Internet access device may provide one or more related services to the LAN such as a domain name service, a DHCP service, security, electronic mail, etc.

In one embodiment, the Internet access device initially connects to the Internet through an Internet service provider over a standard analog telephone line using a modem that requires no configuration on the part of the customer. Once automatically configured, the Internet access device may then communicate with the Internet using either the analog line or a higher-speed line such as ;i ISDN line or a frame relay circuit.

In another embodiment, the Internet access device initially connects to the Internet acting as a single host computer, using a dynamic IP address as its address, requiring no configuration on the part of the user. Once automatically configured, the Internet access device may then act as a router, communicating with the Internet using a static IP address and a range of IP addresses for other devices on a local area network.

An Internet access device is as painless and simple to install for a customer as possible, while at the same time providing valuable features such as a router, firewall, e-mail gateway, web server, and other servers. The Internet access device is able to connect to a configuration server using the standard infrastructure of the Internet.

BRIEF DESCRIPTION OF THE DRAWINGS

The invention, together with further advantages thereof, may best be understood by reference to the following description taken in conjunction with the accompanying drawings in which:

FIGS. 11A and 11B are flowcharts illustrating one method of accomplishing the automatic configuration process step of FIG. 10.

FIG. 12 is a flowchart illustrating one method of accomplishing the Internet access device configuration step of FIG. 11B.

DETAILED DESCRIPTION OF THE INVENTION

In general, there are at least four components to any internet and to the Internet in particular. These four components include server computers, client computers, networks and routers. These components communicate with each other mainly over leased lines provided by the global carriers. A server is any computer on which information is stored and from which other computers, called clients, can retrieve that information. A client computer is a computer used for accessing the Internet, retrieving information from server computers, entering data, and performing other data processing work. A client computer may be used for word processing, sending e-mail, retrieving information from the Internet, transferring files, and many other tasks. A network is any interconnection of computers using wires, switches, network adapters, etc., that allow these computers to communicate. A network may be a local area network (LAN), for example, or may be a wide area network (WAN). Networks are classified as LANs or as WANs depending upon their geographic reach. Networks are connected to each other via routers or gateways, forming internets.

Figure 1:
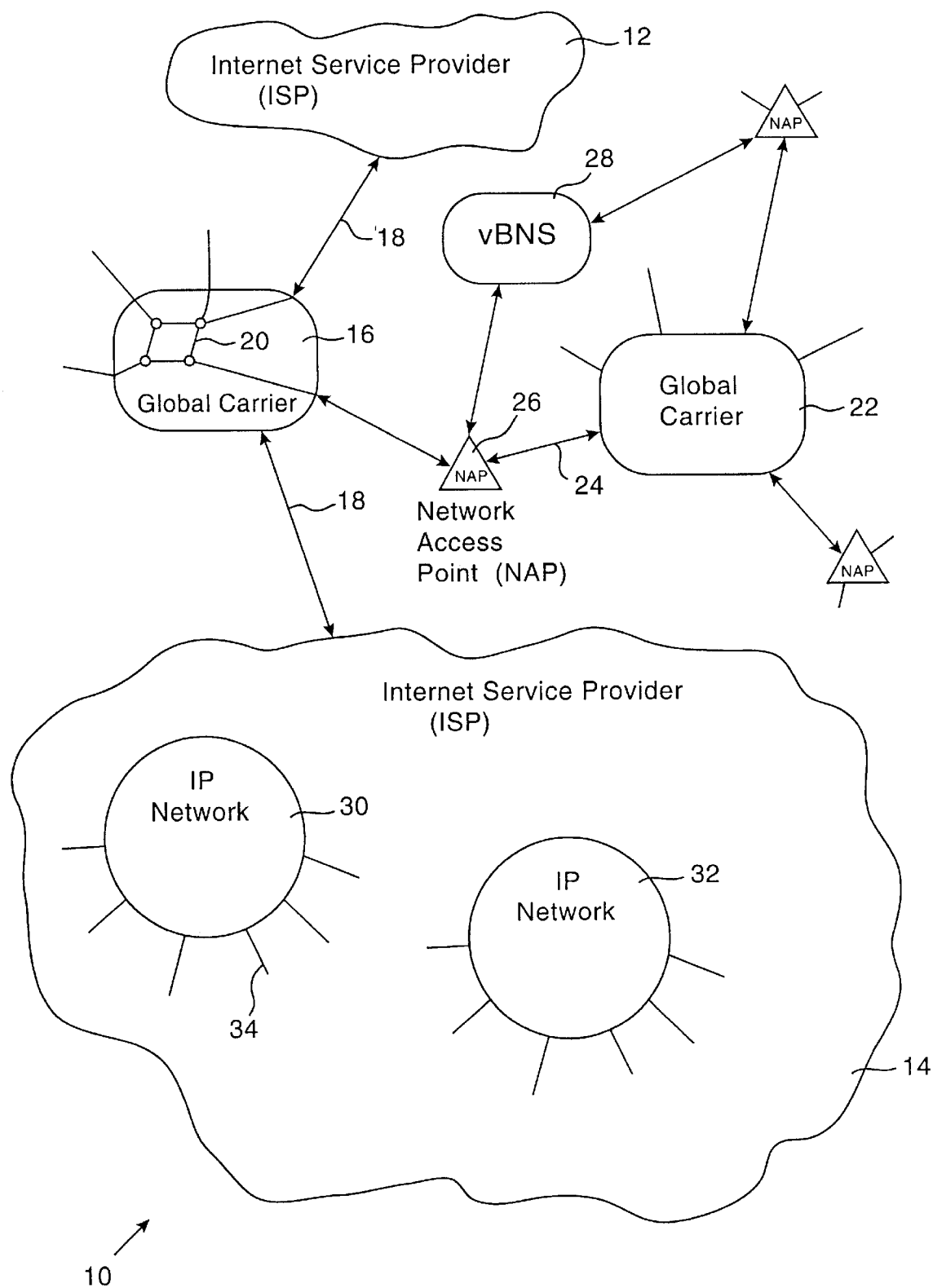
FIG. 1 illustrates an embodiment of a global communications network including an Internet service provider.

FIG. 1 shows a global communications internet 10 that in one embodiment is the Internet. The Internet has any number of Internet service providers (ISPs) 12 and 14 that connect a communication line 18 to a global carrier 16. Global carriers 16 and 22 may be one of the commercial Internet backbone providers such as SPRINT or MCI. Each global carrier has its own separate communications network 20. Communication lines 18 are typically T-1, T-3 or other high-speed lines. An ISP 14 may connect to a global carrier 16 through a hierarchy of providers. For example, ISP 14 may connect through a network service provider such as Netcom Online, UUNET or ANS, which in turn communicate via a network access provider such as the California Network Access Provider in order to communicate with the global carrier. Each of the global carriers may communicate with each other and with a vBNS 28 (very high speed Backbone Service) through a number of Network Access Points (NAP) 26 and communication lines 24. An ISP 14 includes IP networks 30 and 32 each having their own network of communication lines 34. The global carriers 16 and 22 control the physical portions of the Internet including the wires, fiberoptics and the switching equipment. The global carriers lease access to parts of their network to the ISPs, which in turn sell access to the Internet to their customers.

Figure 2:
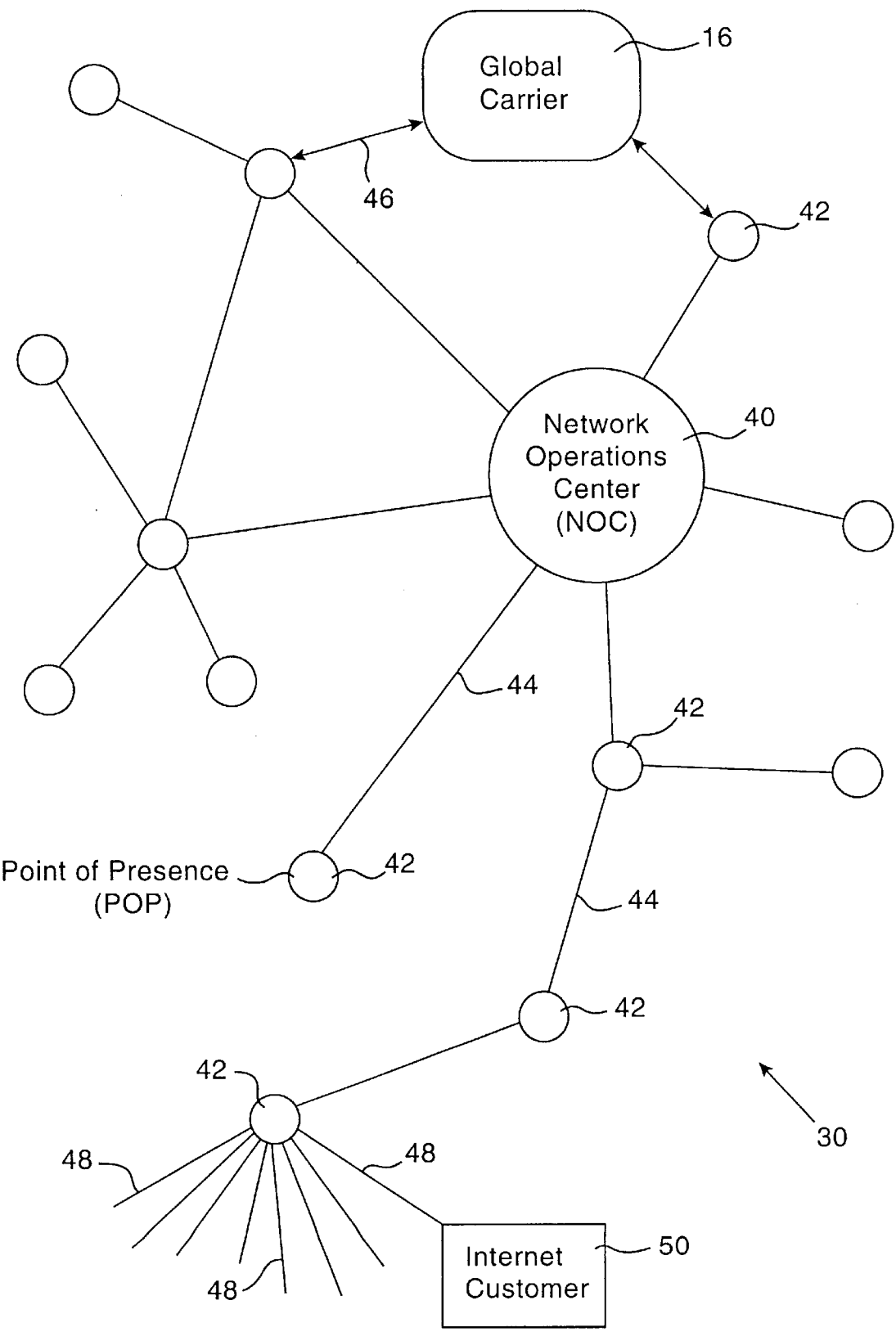
FIG. 2 illustrates an embodiment of an IP network of an Internet service provider.

FIG. 2 illustrates in greater detail an IP network 30 as shown in FIG. 1. Typically, an Internet service provider offers local access to the Internet to its customers through such an extended IP network 30 that consists of perhaps hundreds of points of presence that are connected by high-speed dedicated lines that are leased from a telecommunications provider. The IP network 30 may be one of many IP networks that are managed by an Internet service provider. IP network 30 contains any number of points of presence (POPs) 42 that are interconnected with each other and to a network operation center (NOC) 40. The network operations center 40 contains hardware, software and systems for managing and monitoring the IP network 30. IP network 30 connects over one or more high-speed lines 46 to a global carrier 16. Typically, each POP 42 is connected to another POP and eventually to the NOC via a high-speed leased line 44 using a T-1 or T-3 circuit. Each point of presence 42 has any number of feeder lines 48 that connect the POP to a customer 50. The Internet customer 50 may be one of a wide variety of Internet customers. By way of example, customer 50 may be a casual user dialing in from their home with a single computer, a corporate user, a single computer in a corporation, a router which is used to connect any number of other computers in a local area network to the Internet, a computer used for connecting a corporate intranet to the Internet, or other similar connection. Feeder lines 48 may be dial-up or leased lines, or other type. In general, the communication lines shown take a wide variety of forms. By way of example, lines may be traditional telephone copper wire pairs, a permanently installed wire, a cable system coaxial cable, fiber optic cable, a microwave or other electromagnetic transmission device, or other communication line.

Figure 3:
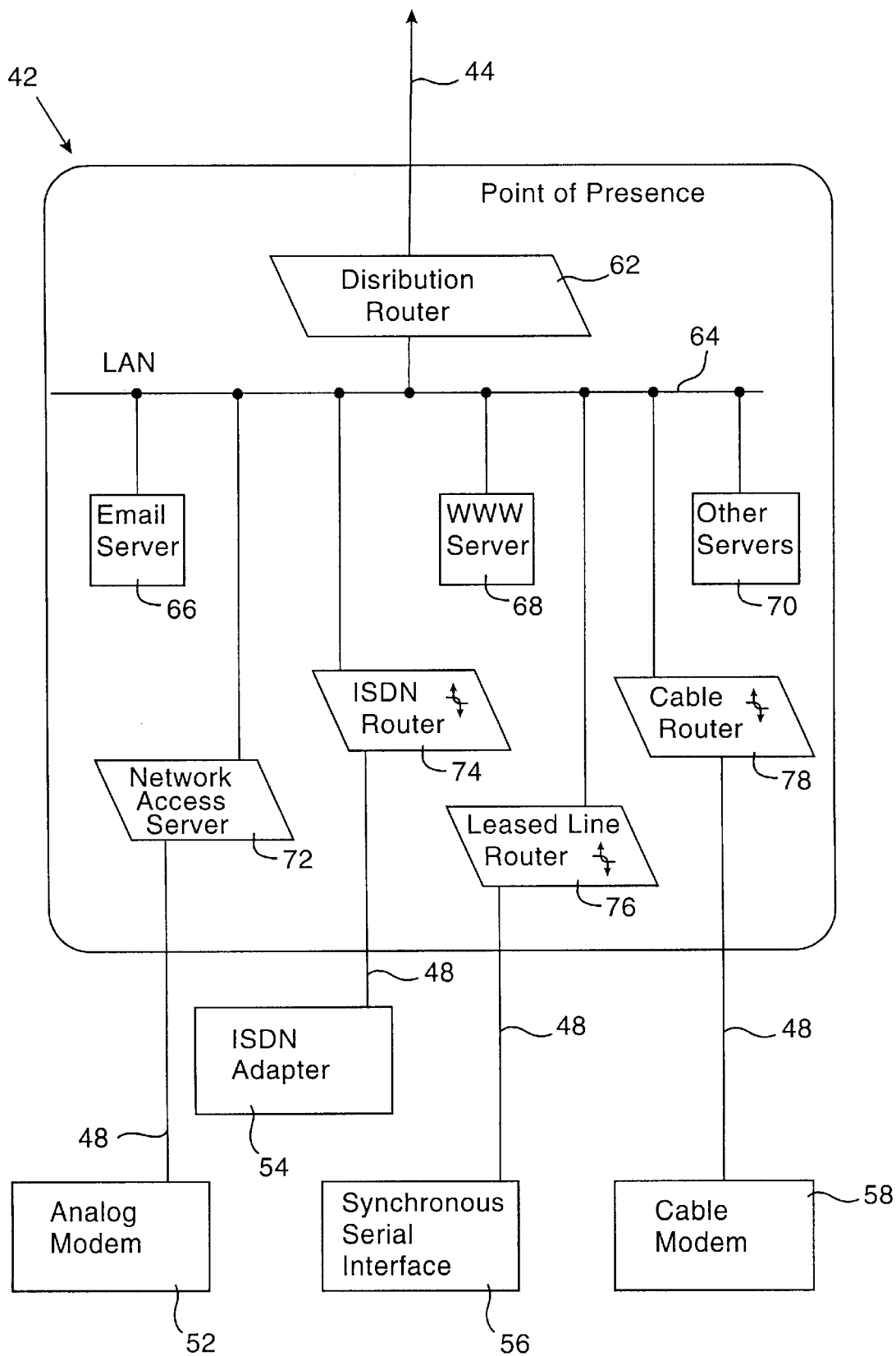
FIG. 3 illustrates an embodiment of a point of presence (POP) for an Internet service provider that has connections for various communications devices used by customers.

FIG. 3 illustrates an embodiment of a POP 42 as shown in FIG. 2. POP 42 has a connection 44 to either another POP, a NOC of an IP network, or even directly to a global carrier. POP 42 also has feeder lines 48 for connecting to various Internet customers. The type of feeder line 48 may vary depending upon the service desired by the Internet customer. By way of example, a customer may connect to the POP using an analog modem 52 over a switched dial-up telephone line. This line may be a plain old telephone service (POTS) line at up to speeds of 56 Kbps. A customer may also connect to a POP using an ISDN adapter 54 that connects over a switched digital telephone line. A customer may also connect to a POP using a synchronous serial interface 56 utilizing a frame relay standard over a high-speed leased digital line such as a T-1 or T-3 line. Such a customer may be part of a large corporate site that uses a wide area router to communicate information to any number of users at the corporate site. Communication may also take place between a customer and the POP using existing cable television network lines. In this case, a customer may have a cable modem 58 for connecting to the POP. Other types of lines and hardware interfaces for connecting with a POP are possible.

A typical POP contains a distribution router 62 connected to a local area network 64 that distributes information among various servers and various hardware interfaces for outside communication to Internet customers. A wide variety of servers may be present within the POP. By way of example, the POP includes an e-mail server 66, a world wide web server 68 and other servers 70 such as a DNS server, news server, etc. By way of example, the distribution router 62 may take the form of a Cisco 7000 router available from Cisco Systems, Inc. A network access server (NAS) 72 is typically used for dial-up accounts. By way of example, the network access server 72 may take the form of a server made by US Robotics Communications or by Livingston Enterprises, Inc. An ISDN router 74 is used for communication over ISDN lines. By way of example, such devices are made by Ascend Communications, Inc. A leased line router 76 is typically used for high speed communications over a leased line using, for example, a frame relay circuit standard. By way of example, leased line routers are currently sold by Cisco Systems, Inc. A cable router 78 may be used to communicate over a cable television network.

Figure 4:
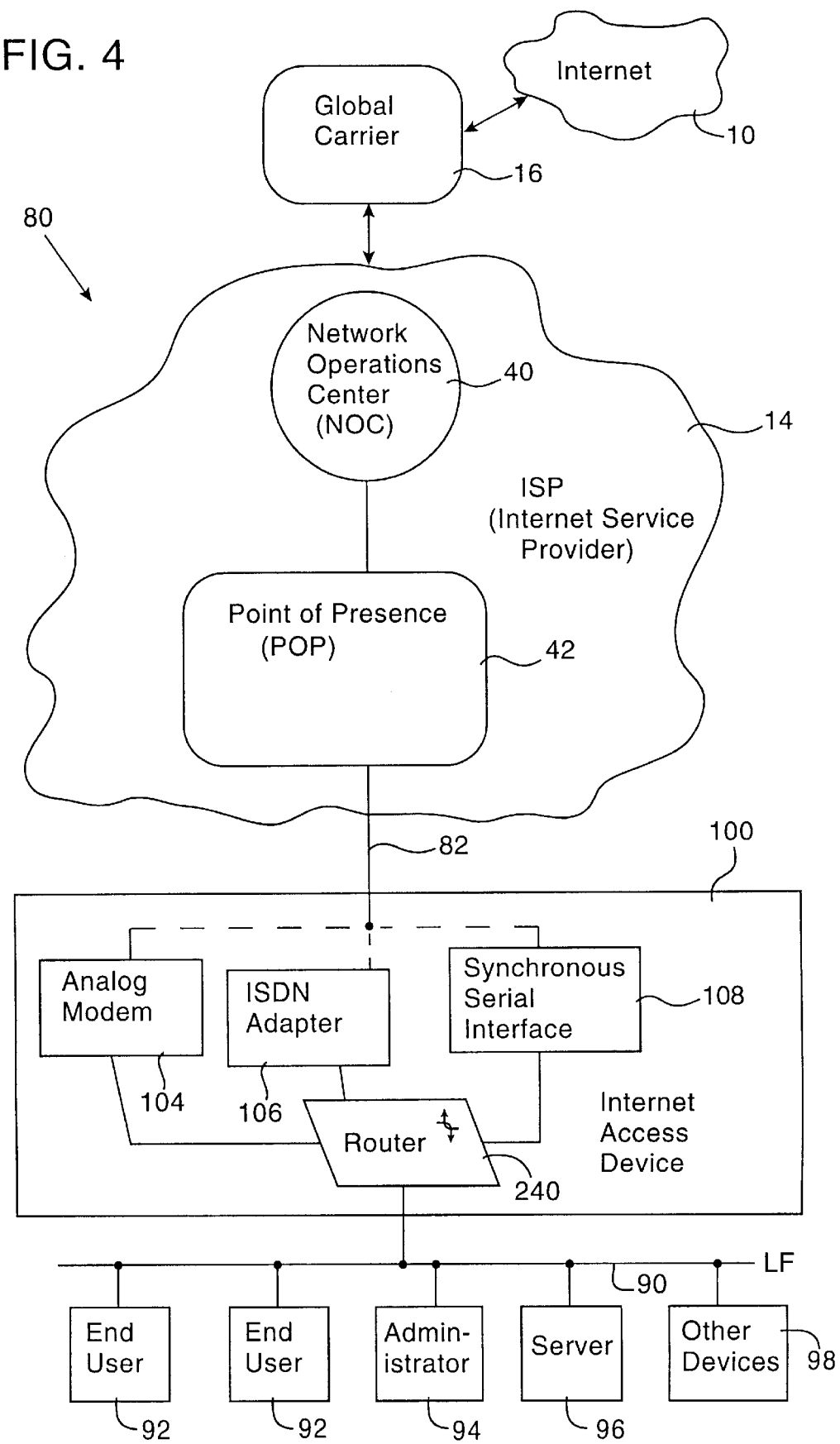
FIG. 4 illustrates an embodiment of an Internet access device that allows communication between the Internet and a local area network of a customer site.
Figure 5:
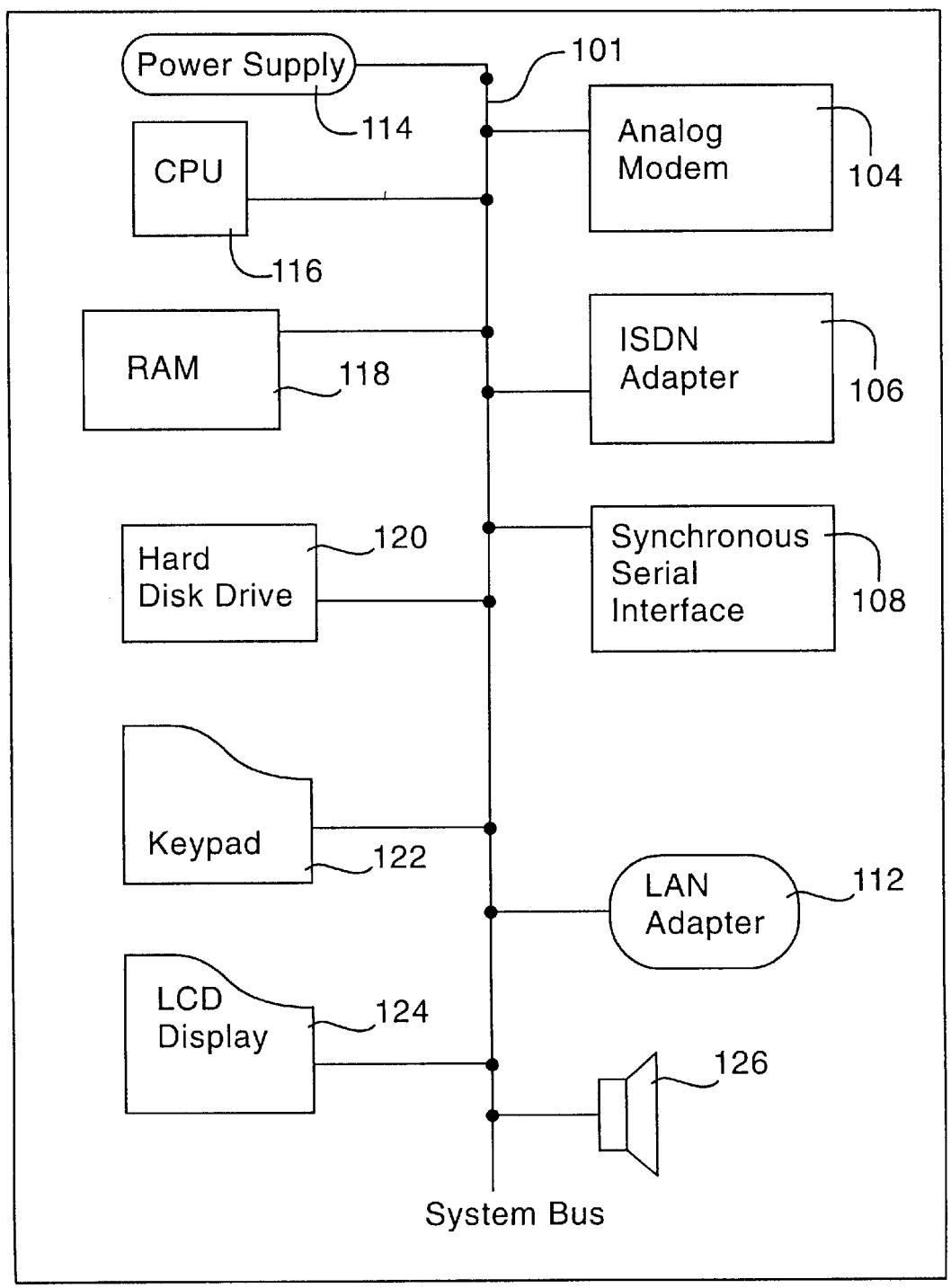
FIG. 5 illustrates an embodiment of the hardware architecture of an Internet access device suitable for use in accordance with the present invention.
Figure 6:
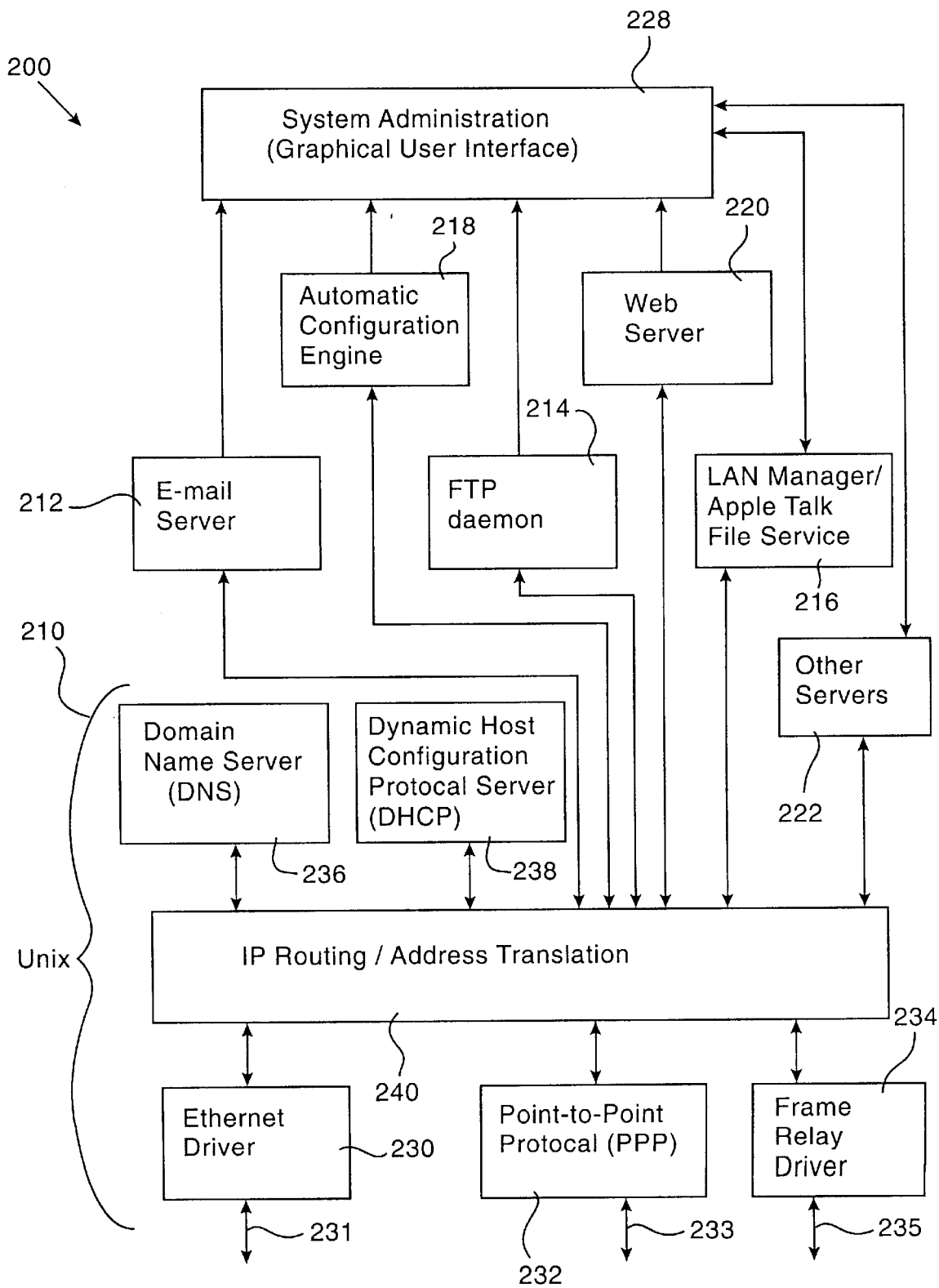
FIG. 6 illustrates an embodiment of the software architecture of the Internet access device illustrated in FIG. 5.

Now having described an embodiment of the Internet, FIG. 4 illustrates an arrangement 80 in which an Internet access device 100 facilitates communication between end users 92 and the Internet 10. FIGS. 4, 5, and 6 illustrate an embodiment of an Internet access device while FIGS. 7 through 12 show and describe a technique by which such an Internet access device may connect to and configure itself for communication with the Internet.

Internet access device 100 connects to a POP 42 of an Internet service provider 14 which in turn connects to a global carrier 16. In this fashion, access is provided to the Internet. In one embodiment, Internet access device 100 connects to a local area network (LAN) 90 at a customer site. By way of example, LAN 90 may take the form of an Ethernet LAN of a corporate or other customer. LAN 90 may connect end users 92, an administrator 94, a server 96, and any number of other devices 98. End users 92 may be a wide variety of users using a wide variety of computing devices. By way of example, end users 92 may use a single personal computer, a network computer, a laptop computer, a workstation, any type of super computer, or any other type of computer used by a user or operating on its own to request, gather, process, send or display information. The administrator 94 is typically a computer used by a system administrator or the like to monitor and administer the LAN 90. Server 96 may be any type of server such as an e-mail server, file server, or other server used for storing information which may be accessed by users on the LAN 90. Other devices 98 may include printers, routers, facsimile machines, gateways, etc.

Internet access device 100 includes an analog modem 104, an ISDN adapter 106, or a synchronous serial interface 108 that are all used to connect through communication line 82 to the POP 42. One or all of these interface devices may be present within the Internet access device 100, although typically only one is in use at a given time for communication with the Internet. Other types of interfaces devices may also be included. By way of example, it is expected that in the near future ADSL and other very high speed modems will be commercially available for use with POTS lines. It is contemplated that such modems can readily be incorporated in the described access device either in place of or in addition to a standard analog modem. Internet access device 100 also includes a router 240 for communicating between one of the interfaces 104, 106 or 108 and the LAN 90.

FIG. 5 shows in greater detail an embodiment of the hardware architecture of the Internet access device 100 shown in FIG. 4. Internet access device 100 includes a system bus 101 to which are connected various devices such as an analog modem 104, an ISDN adapter 106, a synchronous serial interface 108, an Ethernet LAN adapter 112, a power supply 114, a CPU 116, RAM 118, a hard disk drive 120, a keypad 122, an LCD display 124, and a speaker 126.

Typically, analog modem 104 is present in the Internet access device, while devices 106 and 108 may be present if the customer desires one of these types of connections to the Internet. Analog modem 104 may be any suitable analog modem used for communicating over an analog line. By way of example, analog modem 104 is a V.34 28.8 Kbps modem. ISDN adapter 106 may be any suitable ISDN adapter used for communicating over an ISDN line. Synchronous serial interface 108 may be any suitable device used for communicating via a high-speed serial port, and in one embodiment is arranged for communicating using a frame relay packet based interface standard. In one embodiment, Internet access device 100 acts as a frame relay access device (FRAD) when communication using frame relay technology is desired. It is contemplated that other communications interface devices such as 104, 106 and 108 may be used within the Internet access device 100 in order to communicate over a particular type of communication line and using a particular protocol.

LAN adapter 112 may be any suitable device for providing an interface between the Internet access device 100 and a LAN 90. By way of example, LAN adapter 112 may be based upon a Local Talk or a token ring standard. In the embodiment shown, LAN adapter 112 is for an Ethernet LAN with an integral 4-port 10BaseT hub, although of course, a wide variety of other LAN adapters may be used in conjunction with or alternately to the adapter shown. Internet access device 100 also includes a power supply 114 that includes a battery backup. CPU (central processing unit) 116 may be any suitable CPU and in the embodiment shown, is an Intel 80486 CPU. RAM 118 provides random access memory used to store temporary data such as routing tables, packet buffers, program storage, etc. for the Internet access device. Hard disk drive 120 may be any suitable hard disk, and in one embodiment is a 1.2 GB IDE hard disk drive used for storing user information such as accounts, electronic mail, web pages, etc. Of course, it is expected that each of the described components may be upgraded as more powerful components become available and cost effective.

Keypad 122 may be any suitable keypad for entering numbers and information by a user to the Internet access device. By way of example, keypad 122 may take the form of an 18 key keypad including a numeric keypad similar to that found on a push button telephone, and other keys for inputting information to the Internet access device. LCD display 124 is provided for presenting information to the user, along with status lights indicating the status of the Internet access device. The status lights include information such as power, system activity, disk activity, LAN activity, and WAN activity. In the described embodiment, the LCD display 124 takes the form of a 128×64 pixel LCD display, although other displays are possible. Speaker 126 is any suitable speaker for presenting audible information to a user.

FIG. 6 illustrates an embodiment of the software architecture 200 of the Internet access device 100 of FIG. 5. The software architecture 200 includes an operating system 210 that communicates with each of an e-mail server 212, an FTP daemon 214, a LAN Manager/AppleTalk file server 216, an automatic configuration engine 218, a web server 220, and other servers 222. These elements 212–222 are each in communication with a system administration module 228 that uses a graphical user interface.

Operating system 210 may be any suitable operating system. By way of example, in the described embodiment, operating system 210 is the BSD UNIX operating system. This operating system 210 includes an Ethernet driver 230, PPP (Point to Point Protocol) software 232, and a frame relay driver 234 in communication with an IP Routing/address translation module 240. Ethernet driver 230 communicates over line 231 to an Ethernet card. PPP software communicates over line 233 to either a modem or an ISDN adapter. Frame relay driver 234 communicates over line 235 to a synchronous serial interface card. The address translation module 234 allows for both host (1-N) and network (N-N) address translation. The module 240 is also in communication with a domain name server (DNS) and a dynamic host configuration protocol (DHCP) server 238 which supply appropriate connectivity protocols to the Internet. The IP routing may be performed by any suitable routing software used for receiving information over the Internet and routing it to the appropriate device on LAN 90. By way of example, a GateD router with support for OSPF, RIP and BGP routing protocols may be used.

E-mail server 212 provides e-mail service both internally to users of a LAN 90 of a company, and also externally to the world via the Internet. Every user on the LAN 90 is provided with their own unique e-mail address. FTP (file transfer protocol) daemon 214 is used for both internal and external file storage and transfer using industry standard Internet file transfer protocols. LAN Manager/AppleTalk file server 216 is a file server providing a central location by which users may exchange files. Automatic configuration engine 218 provides for the automatic configuration of the Internet access device 100 for communication with the Internet. An embodiment of how this automatic configuration engine configures the Internet access device will be discussed in more detail below with reference to the flow charts of FIGS. 10, 11 and 12.

Web server 220 may be any suitable web server for providing both internal and public web pages for not only a company, but also for each user on the LAN 90. In one embodiment, web server 220 is an Apache HTTP web server. Other servers 222 include such servers as directory servers, news servers, catalog servers, search engines, proxy servers, authentication servers, etc.

System administration module 228 provides a graphical user interface by which a system administrator and/or individual users may access the Internet access device in order to manage e-mail and web pages, perform system administration, allow access by individual users, and in general monitor and support the functioning of the Internet access device by users on the LAN 90. In one embodiment, system administration module 222 uses an HTML-based animated user interface for use with either Netscape NAVIGATOR or Microsoft INTERNET EXPLORER that allows all-in-one administration from any desktop and from any platform. System administration module 228 also provides for self-maintenance via an agent based metaphor, automated backups of any user data to any workstation on the LAN 90 or to the ISP, automated software management for software updates, and automated log and audit management. An aspect of system administration module 228 is disclosed in greater detail in U.S. patent application entitled "Automatic Setup Of Services For Computer System Users" referenced above.

Figure 10:
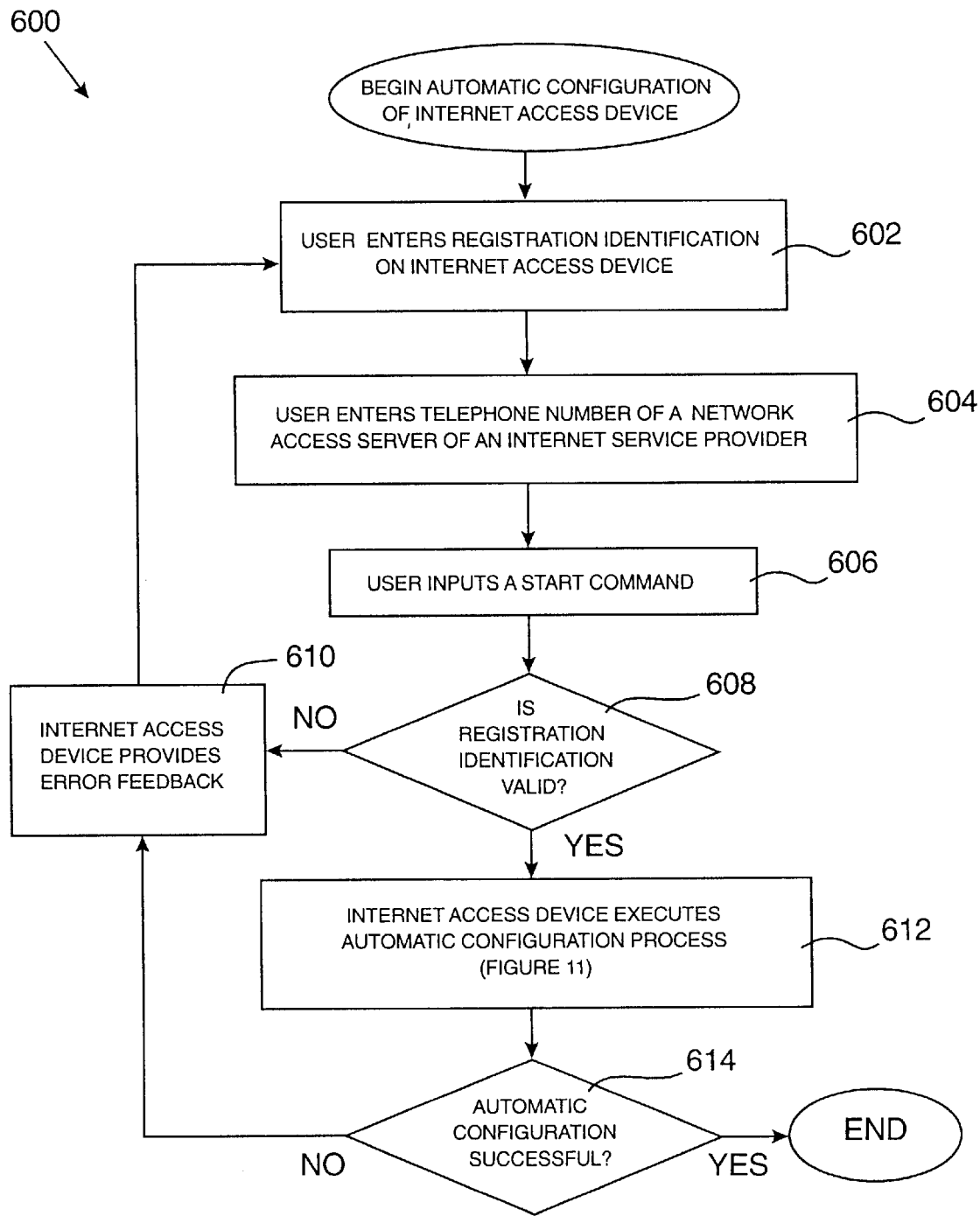
FIG. 10 is a flowchart illustrating a method for automatically configuring an Internet access device for communication with the Internet in accordance with one embodiment of the present invention.

Now that an embodiment of an Internet access device has been described, a method of advantageously using such a device will be described. The Internet access device is advantageous because, once installed at a customer site it is able to automatically connect itself to an appropriate location on the Internet, download configuration information and configure itself for a level of service desired by the customer. FIGS. 10, 11 and 12 illustrate one embodiment of a method of automatically configuring the Internet access device. Before the Internet access device configures itself, the customer and an Internet service provider communicate in order to determine an appropriate level of service for that customer and corresponding configuration information for the Internet access device. This interaction will now be described.

When a customer first determines that he or she desires a connection to the Internet the customer contacts an Internet service provider to request a particular level of service. This desired level of service includes many different variables. For example, the customer must first determine if they wish to connect a LAN to the ISP or simply a single machine to the ISP. Also, the type of connection must be determined. A customer may be connecting to the ISP over a dial-up line or over a permanent leased line. Also, the customer may desire an analog line using a conventional or high speed modem, an ISDN line using an ISDN adapter, or a leased line that may be a T-1 or a T-3 line using frame relay technology. Other types of lines and levels of service may also be specified by the customer. The customer may also determine a desired domain name, and a range of IP addresses that it requires. A customer with only a single host computer may need only a dynamic IP address, while a customer such as a corporation or provider of information may require not only a static IP address but also a range of addresses for various computers connected to a LAN. Other information from the customer may also be required by the ISP such as the number of users on the LAN, geographic location (used to determine which POP to connect to), anticipated storage needed for a web site, etc.

Once the customer has specified his needs, the ISP assembles all of this customer information and inputs it into an ISP database. Some of this customer information comes from the customer itself (e.g., a desired domain name), while some information is generated by the ISP itself (e.g., the IP address block). Using the information in this database, the ISP is then able to generate a configuration file for future use by the customer. The configuration file contains all of the configuration needed by the customer to configure his Internet access device for the customer's desired level of service. Any suitable form and language for a configuration file may be used. By way of example, one such suitable configuration language for representing customer configuration information may be found in the Appendix.

If the configuration file is stored on the configuration server as a flat text file it is possible to create this file manually using any text editor. It Is also possible that a configuration file may be automatically generated from the ISP customer database once all of the customer information has been entered, or the configuration file may be generated on the fly from the customer database when a request is made from an Internet access device to download a particular configuration file from a configuration server.

Once a configuration file has been generated, this configuration file is stored by the ISP onto a configuration server. In one embodiment, the configuration file is stored as a configuration record of a database on a dedicated configuration server. This configuration server may be located on an IP network within the ISP itself, or the configuration server may be located at any appropriate location on the Internet that is accessible by an address. In other embodiments, the configuration server may be located outside of the Internet or an internet, in a location that is accessible by a customer desiring access to a configuration file.

A more detailed description of the types of information contained within this configuration file is explained below with reference to FIG. 12. Once the ISP has determined an IP address for the configuration server that holds the customer's configuration file, the ISP generates a registration identification number for that customer. Generation of this registration identification number will now be explained in more detail with reference to FIG. 7.

Figure 7:
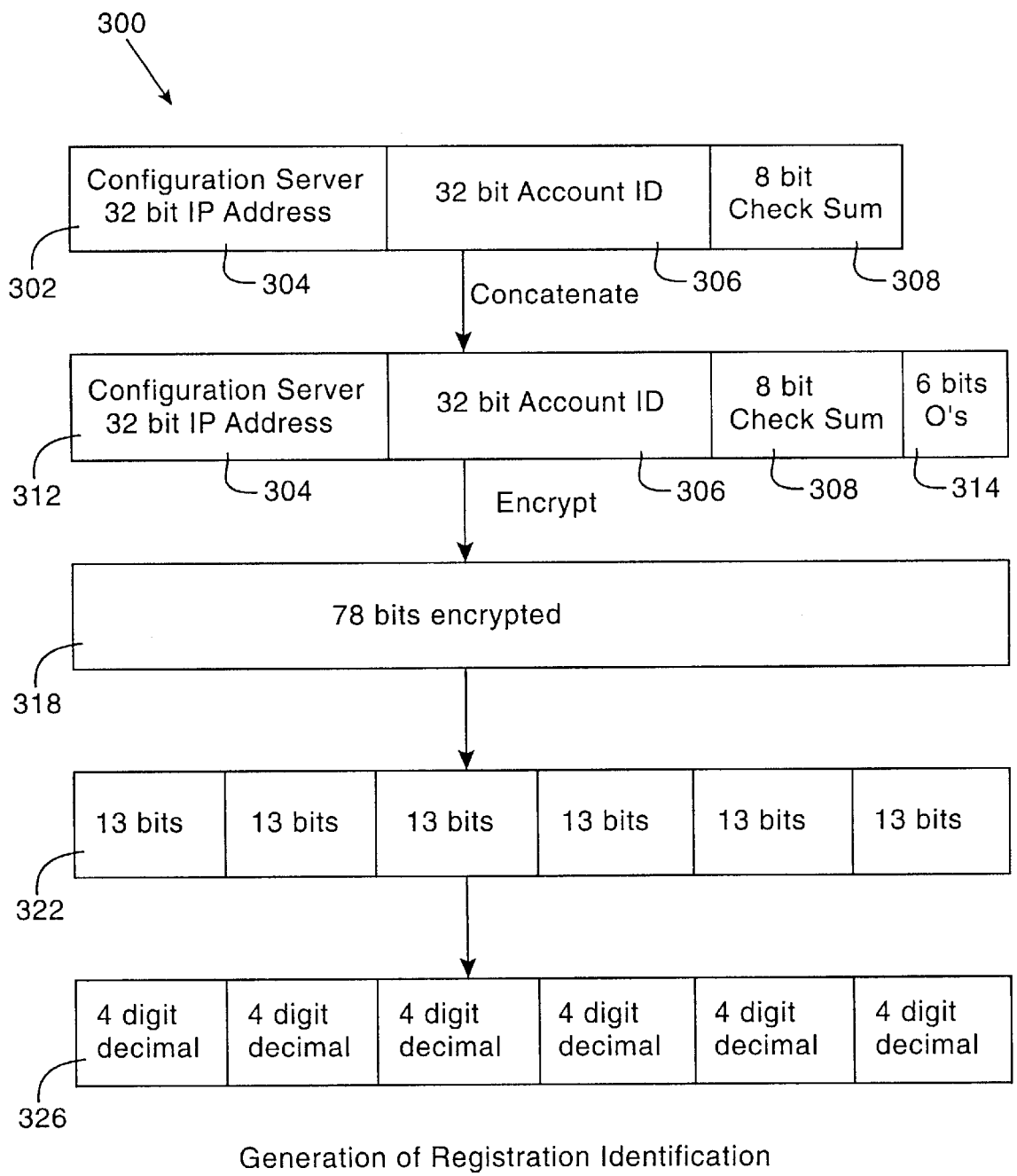
FIG. 7 illustrates an embodiment of a process by which a registration identification number is formed and then encrypted into decimal digits.

FIG. 7 illustrates a method 300 by which a registration identification number (registration ID) may be generated. Initially, a registration ID 302 includes a 32-bit IP address 304 for the configuration server on which the customer's configuration record resides, a 32-bit account identifier (account ID) 306, and an 8-bit check sum 308. The 32-bit IP address 304 uniquely identifies the configuration server on the Internet. The 32-bit account ID 306 is an arbitrary 32-bit number that uniquely identifies the Internet access device for a particular customer. This account ID 306 will be used to access that customer's unique configuration record on the configuration server identified by the IP address 304. The 8-bit check sum 308 is used for detecting erroneous customer keypad entries on the Internet access device. Without the check sum 308, the Internet access device would have to dial-up and connect to the configuration server before being able to alert the customer that an entered registration ID was invalid.

Next, a series of six "0" bits 314 are concatenated onto the registration ID 302 to produce a registration ID 312. Of course, the size of the various fields may be widely varied and additional or alternative fields may be used as well. After the registration ID has been concatenated, it is encrypted to produce an encrypted registration ID. In the described embodiment, the 78-bit registration ID 312 is encrypted to produce a new 78-bit encrypted registration ID 318. As will be appreciated by one of skill in the art, any suitable encryption technique may be used. Next, the encrypted registration ID 312 is divided into groups of multi-digit numbers to create a decimal digit registration ID 326. When a 78-bit encrypted registration ID is used, the encrypted 78 bits are divided into groups of 13 bits each as shown at 322. Finally, each group of 13 bits is transformed into its corresponding four digit decimal numeral resulting in a 24 decimal digit registration ID 326. It is this registration ID 326 which is delivered to the customer from the ISP. Thus, the registration ID 326 contains information allowing a customer to access a configuration server on the Internet and to download a specific configuration file unique to that customer's requirements.

Once the registration ID has been generated, the ISP then ships to the customer an Internet access device, the registration ID, and a telephone number for accessing the ISP. Typically, this telephone number is a local telephone number or a toll-free "800" telephone number that the customer may use to dial into a network access server 72 of a local point of presence 42 for that Internet service provider. However, this telephone number may be any suitable number that allows the customer to gain access to the Internet and thereby begin the process of retrieving its configuration file from the configuration server. Once the customer receives the Internet access device, the registration ID and the telephone number, the customer is then able to install the Internet access device, connect it to his computer system or LAN and begin the process of automatic configuration. This process of automatic configuration will be discussed in more detail below with reference to the flow charts of FIGS. 10, 11 and 12, and with reference to the illustrations of FIGS. 8 and 9.

Figure 8:
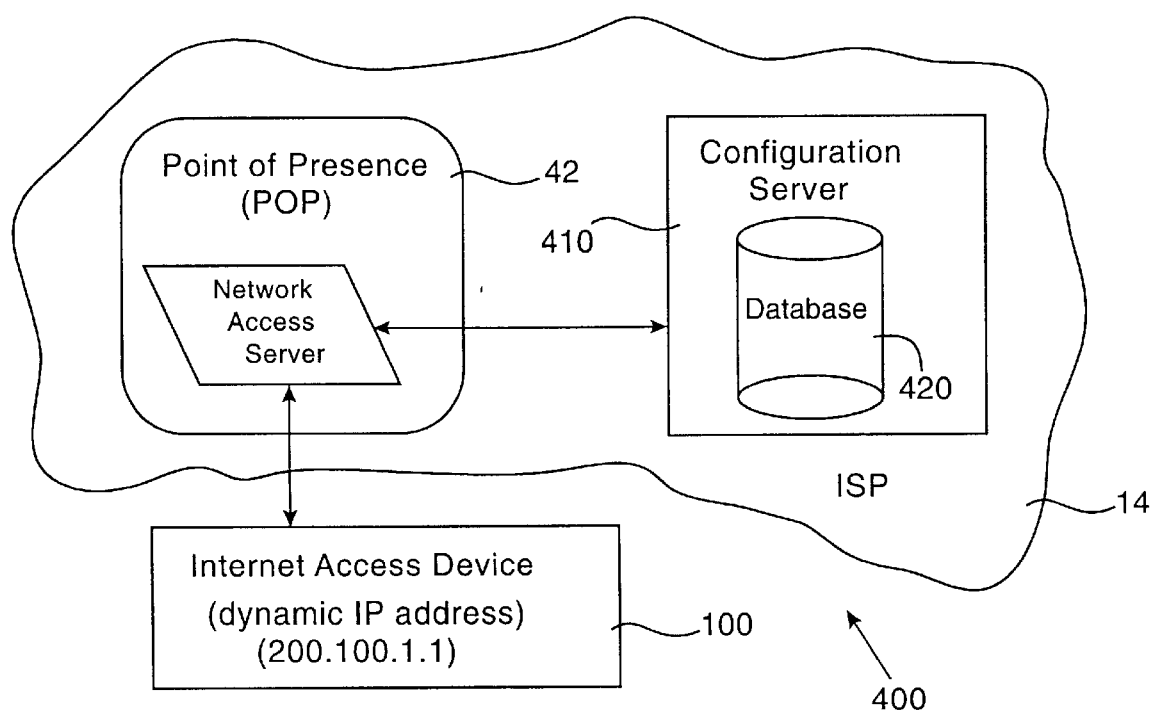
FIG. 8 illustrates how an Internet access device may connect to a configuration server on the Internet using a dynamic IP address.

FIG. 8 shows an arrangement 400 in which an Internet access device 100 is connected to a local point of presence 42 through a network access server. In this arrangement, Internet access device 100 has connected to the POP 42 using a dynamic IP address of "200.100.1.1" (for example) and has requested access to configuration server 410 which contains a database 420 of customer configuration records. FIG. 8 will be discussed in greater detail below with reference to steps 714 through step 724 of FIG. 11.

Figure 9:
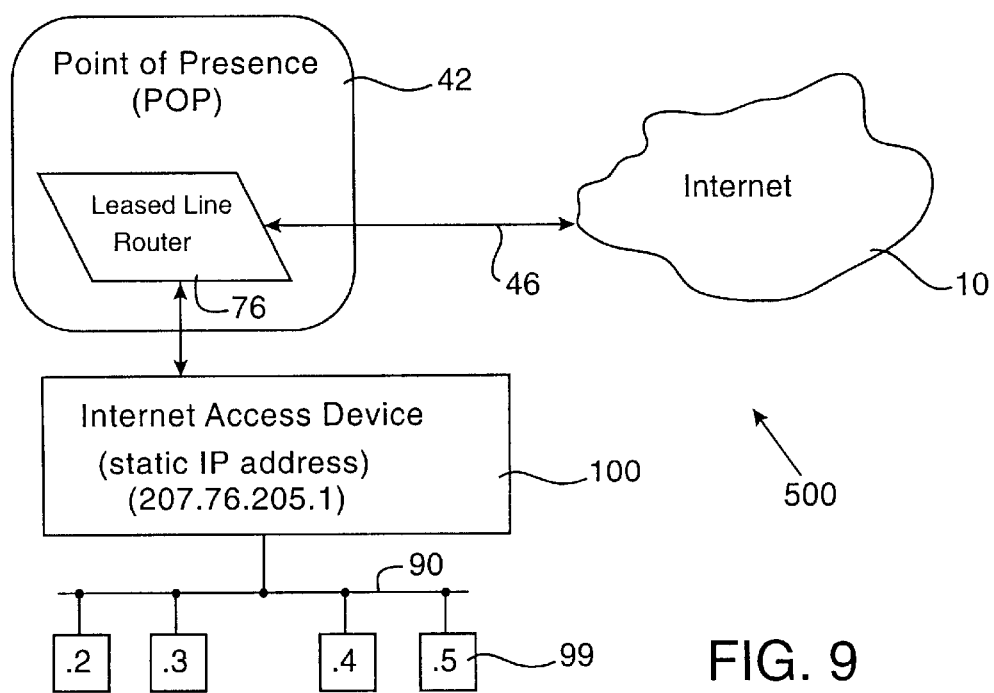
FIG. 9 illustrates how an Internet access device may be permanently connected to the Internet using a static IP address.

FIG. 9 illustrates an arrangement 500 in which an Internet access device 100 has downloaded its configuration record, has automatically configured itself, and is now connected to the Internet at its desired level of service. FIG. 9 shows an Internet access device 100 that is connected to a leased line router 76 of a local POP 42 using a leased line and frame relay technology. Through this line the Internet access device now has access to the Internet 10 through communications line 46. The Internet access device 100, already having been configured, routes to the LAN having (for example) address 207.76.205.X (where "X" represents one of a range of IP addresses, such as from "2" to "5"), and has a LAN 90 with attached computers 99 having IP addresses of 207.76.205.2, 207.76.205.3, 207.76.205.4 and 207.76.205.5. The Internet access device itself occupies an address at 207.76.205.1. It should be noted that these addresses are for example only. Each customer will receive a globally unique range of addresses. FIG. 9 will be discussed in greater detail below with reference to FIG. 12.

Once a customer has received a registration ID and a local telephone number from the ISP, the customer may begin the automatic configuration process for the Internet access device. FIG. 10 is a flowchart showing the overall automatic configuration steps 600. As preparation, the customer first installs the Internet access device by supplying power, connecting the Internet access device to a telephone line and to the customer's computer system or LAN.

In step 602 the customer enters the encrypted registration ID supplied by the ISP onto the Internet access device 100 by way of keypad 122. Next, in step 604 the user enters the local telephone number of a network access server located on the ISP's network. This number may be the number of a local point of presence (POP) for the Internet service provider. This telephone number is a number for a basic analog dial-up telephone line by which the Internet access device may dial into and connect with a corresponding modem of the network access server of the ISP. In this fashion, the Internet access device may connect to the ISP (and to the Internet) with a minimum of configuration. During this phase, the Internet access device emulates a simple single address host. This allows it to utilize existing configuration protocols such as LCP and IPCP to gain an initial temporary connection. This is a "bootstrapping" technique in which a simple mechanism is employed to load and initiate a more complex one. The Internet access device comes ready to connect to an ISP over a standard dial-up analog telephone line (i.e. a POTS line); the customer is not required to perform any setup, configuration or entering of information in order to access the ISP.

In step 606 the user inputs a start command using keypad 122. In step 608 the Internet access device determines whether the entered registration ID is valid by using the 8-bit check sum. If the registration ID is not valid then in step 610 the Internet access device provides error feedback by way of the LCD display 124. If the registration ID is valid, then in step 612 the Internet access device begins execution of an automatic configuration process which will configure the Internet access device for communication with the Internet at a customer desired level of service. For example, the Internet access device will be configured for using an ISDN line or a frame relay circuit, and may be configured with a static IP address and a range of IP addresses for use by various computers connected to the Internet access device. This type of configuration typically requires extensive manual effort on the part of the customer at the customer site; the present invention is advantageous because it performs this type of configuration automatically. Step 612 will be explained in greater detail below with reference to FIG. 11.

If automatic configuration has been successful, then in step 614 the program ends. However, if automatic configuration was not successful, then in step 610 error feedback related to this condition is provided to the user and control returns to step 602 where the user is able to enter the registration ID and telephone number once again. In step 614 the automatic configuration process may fail due to a problem with the modem, a hardware failure, an incorrect configuration server IP address, an incorrect account ID for the user, or other error.

Figure 11A:
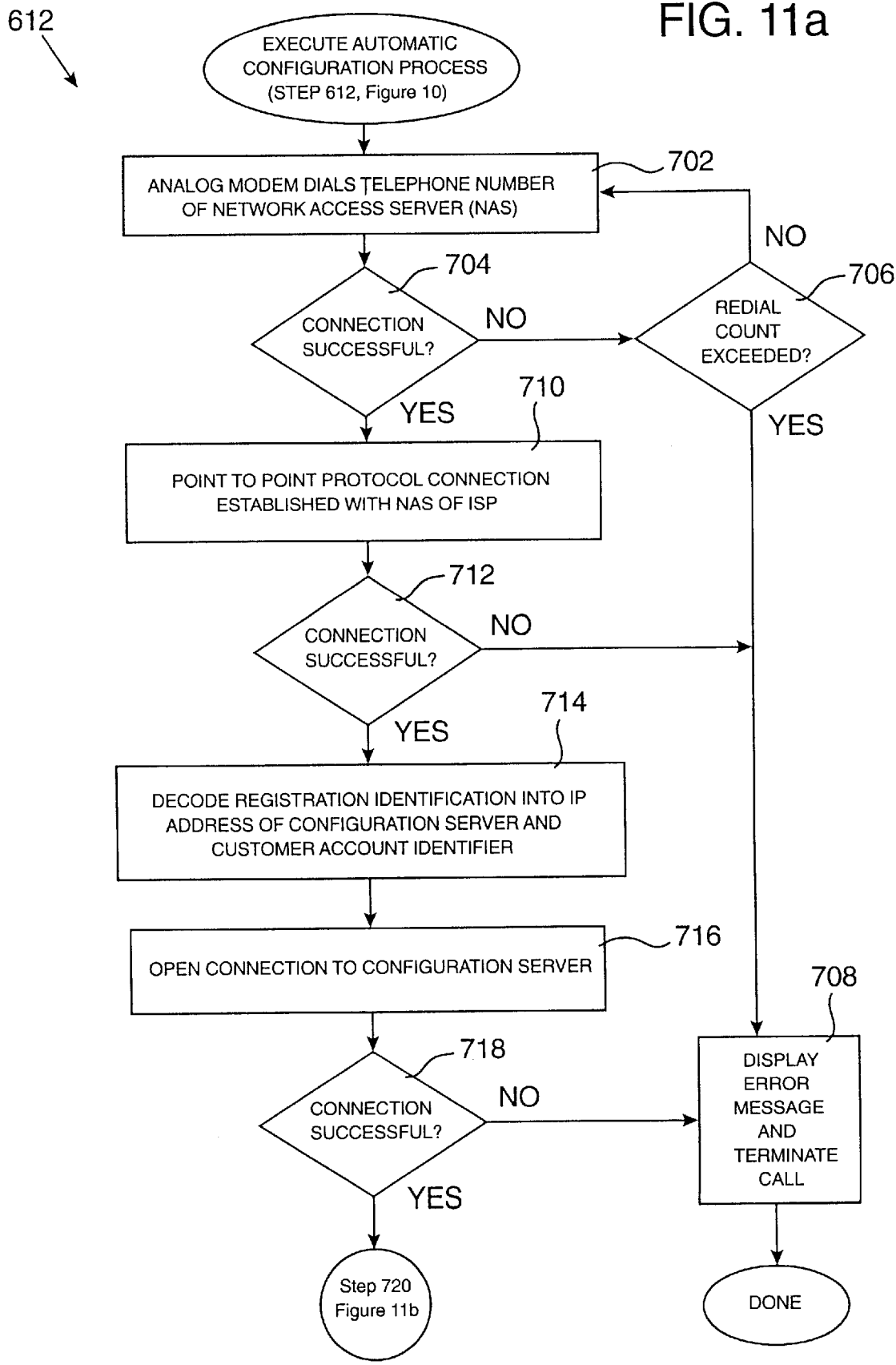

FIGS. 11A and 11B illustrate in greater detail one method suitable for carrying out the automatic configuration process step 612 of FIG. 10. This step allows the Internet access device to automatically dial into an Internet service provider without any configuration needing to be performed by the user. Once connected to an ISP, the Internet access device is then able to automatically locate a configuration server, request a unique configuration record for that Internet access device, download that configuration record, and then automatically configure itself for communication with the Internet using the configuration record.

In step 702 the analog modem 104 of Internet access device 100 automatically dials the local telephone number provided by the ISP and entered by the customer to contact a network access server (NAS) 72 of a local point of presence 42 of the ISP. This connection is made over a basic analog, dial-up telephone line that is straightforward to use and requires no configuration or input from the user of the Internet access device. Step 704 determines whether a successful connection has been made from the Internet access device to the network access server of the ISP. If no connection was made, then control returns to step 702 and the NAS is dialed again, unless in step 706 it is determined that the redial count has already been exceeded, in which case control moves to step 708. In step 708 the Internet access device displays an error message, terminates the calling procedure and then returns to step 614 of FIG. 10 with a negative result.

If the connection is successful, then in step 710 a Point to Point Protocol (PPP) connection is established between the Internet access device and the NAS of the ISP. Establishing a PPP connection is known to those of skill in the art and involves password negotiations, exchange of addresses, and other standard handshaking. If this PPP connection is not successful, then step 712 moves control to step 708, an error message is displayed, and a negative result is returned to step 614 of FIG. 10. Reasons why a connection may not be successful include an invalid password used by the Internet access device, an incorrect telephone number, malfunctioning equipment, busy signal, or other.

If the connection is successful, then in step 714 the registration ID entered by the user is decoded into an IP address of the configuration server and a customer account ID. It should be appreciated that an encoded registration ID may be decoded into its various parts in a wide variety of fashions. By way of example, a registration ID may be decoded with reference to FIG. 7 in a reverse fashion to the procedure previously described for encoding a registration ID. First, a 24 decimal digit registration ID 326 is divided up into six groups of four digit decimal numbers and then each four digit numeral is transformed into its representative 13 binary digits to form a registration ID 322. These six groups of 13 bits each form a registration ID 318 of 78 bits. Next, the 78-bit encrypted registration ID 318 is decrypted to form a 78-bit registration ID 312. The first 32 bits are the IP address 304 of the configuration, the second 32 bits are a unique customer account ID 306, the next 8 bits are a check sum, and the last six bits are all zeros.

Using the decoded IP address 304 of the configuration server, in step 716 a connection is opened to this configuration server via the network access server over the Internet. Any standard technique may be used to open a connection to a configuration server located on the Internet using its IP address. By way of example, an HTTP protocol may be used, although it is contemplated that an LDAP (light weight directory access protocol) may also be used. FIG. 8 illustrates a connection from an Internet access device 100 to a network access server of a POP 42 of an ISP, which in turn is connected to a configuration server 410. The Internet access device has connected to the ISP using a dynamic IP address of "200.100.1.1". Connecting in this fashion using an analog modem and a dynamic IP address is a simpler technique and requires no configuration of the Internet access device on the part of the customer. In the embodiment shown, the configuration server 410 is located within the Internet service provider, although the configuration server may be present at any location on the Internet and accessed via its IP address.

If this connection is not successful, then in step 708 an appropriate error message is displayed, the call is terminated, and a negative result is returned to step 614 of FIG. 10.

In step 718 a connection may be unsuccessful because of an incorrect registration ID, an incorrect configuration server, trouble on the Internet, the configuration server being down, or other communications difficulties. However, if the connection is successful, then step 718 transfers control to step 720 of FIG. 11B.

In step 720 the Internet access device asks the configuration server 410 for the configuration record stored in database 420 that is identified by the customer account ID. This is typically done using an HTTP "get" request. The configuration record may be stored in a database 420 using a wide variety of techniques. By way of example, a configuration record may be stored in any typical database. In other embodiments, the configuration record takes the form of a configuration file on the configuration server. For example, a configuration file may be stored as a flat text file in a directory on the configuration server 410. In a second embodiment, the URL requested from the server resolves to a CGI (Common Gateway Interface) script, which takes the registration ID as extra path information. This extra path information is passed to the CGI script which then accesses the ISP database as required and outputs the configuration file corresponding to the customer account ID. In this second embodiment, the "get" request also sends two field values to be stored on the server, namely the Internet access device's Ethernet address, and the registration ID.

If the configuration record does not exist, then in step 734 an appropriate error message is displayed, the call is terminated, and a negative result is returned to step 614 of FIG. 10. A record may not exist due to an incorrect customer account ID, an unknown customer account ID, a record not being present, or other discrepancy or problem with the database.

If however, the record does exist, then in step 724 this configuration record is downloaded from the configuration server 410 via the Internet and the ISP to the Internet access device 100 at its temporary IP address. FIG. 8 illustrates a database 420 containing a configuration record that may be downloaded to the Internet access device in this fashion. This configuration record may store the configuration information needed by the Internet access device in any suitable format. By way of example, a configuration language such as may be found in the Appendix may be used. Next, in step 726 the Internet access device automatically configures itself using the information from the configuration record. This step will be explained in greater detail below with reference to FIG. 12.

If the configuration is unsuccessful, then in step 734 an appropriate error message is displayed, the call is terminated, and a negative result is returned to step 614 of FIG. 10. If the configuration was successful, then in step 730 the call is terminated and in step 732 a "configuration successful" message is displayed to the user, a positive result is returned to step 614 of FIG. 10 and the procedure ends. Once the Internet access device has been successfully configured, the customer is then able to communicate with the Internet using a more complex, or higher speed method such as an ISDN line or a frame relay circuit. The IP routing configuration is then performed, followed by the configuration of various network services such as electronic mail and a web publishing. This configuration has occurred automatically, without intervention on the part of the customer.

FIG. 12 describes in more detail the configuration step 726 of FIG. 11B. Before FIG. 12 is described in detail, the types of information that may be present in the configuration record are first described. The Internet access device is able to automatically configure itself for communication with the Internet using information contained in the configuration record. The configuration record contains information such as the customer domain name, the customer LAN network IP address, the Internet access device IP address, the DHCP range, time zone and NTP servers for time configuration, IP addresses for forwarding name servers, PPP account log in and password information, web mirroring configuration information, and mail configuration information. Other information may be added to the configuration record such as IP multicast router information, secondary DNS server information, etc.

It should be appreciated that the configuration record may contain any other information needed by the Internet access device to automatically configure itself for communication with a wide variety of communication lines in order to connect to the Internet. In this fashion, a customer is not required to manually enter information into the Internet access device at the customer site, nor is the customer required to modify or configure the Internet access device in any way. Configuration occurs automatically once a registration ID and a telephone number have been entered into the Internet access device. This allows for a very quick, simple, and error-proof configuration process. In addition, if the customer seeks a different configuration, or desires a different level of service in order to connect using a different type of communication line, this automatic configuration process may be invoked by the customer at any time in order to automatically download a new configuration file in order to configure their Internet access device again.

A wide variety of configuration information is contained within the configuration record. By way of example, the configuration record contains link information related to the actual hardware that will connect the Internet access device to the ISP. There is also IP network information that relates to Internet protocols, and DNS naming information relating to the process of using the Internet. Additional application information relates to configuration data that allows optional software applications to be configured correctly on the Internet access device. Examples of specific types of information for each of these categories will now be given. Further examples of information available in a configuration record may be found in the Appendix.

The link information includes configuration parameters related to a particular type of line service desired by a customer in addition to PPP link layer information. For example, if a customer desires a connection over a dial-up line using a modem, then POTS parameters (plain old telephone service) are supplied. These parameters include a local telephone number for the ISP, speaker on, dial-on-demand, idle time-out, permissible connect hours, etc. Alternatively, if the customer desires an ISDN line, then additional parameters are supplied. These parameters include a dial-up telephone number, a directory number for the customer, an SPID (service profile identifier), an ISP telephone number, a switch type, etc. A reference of ISDN connection parameters may be found in the document "NI-1 Standard" available from ANSI or ITU. On the other hand, if a frame relay circuit is desired, then parameters supplied in the configuration record would include DLCI (data link communication interface) information, LMI (link management interface) information, etc. Other parameters useful for configuring a frame relay connection may be found in the reference "UNI Specification", available from Frame Relay Forum. In addition to either of the sets of link parameters for a desired service specified above, the configuration record also includes PPP link layer information such as a login id, a password, authentication method, compression type, etc.

The configuration record also includes configuration information related to the IP network of the Internet service provider. This information includes an IP network address and an IP network mask. Also, an address translation parameter indicates whether the Internet access device will appear to the ISP as a single user or as multiple users on a LAN. A remote host parameter sets an IP address for the remote end of the link, such as a router at an ISP. A set of DHCP parameters allow other computers on a LAN attached to the Internet access device to be configured either with dynamic IP addresses, or with static IP addresses that are used for such servers as web servers, e-mail servers, printers, etc. Other parameters useful for IP network configuration are routing protocols desired (e.g. BGP, RIP), etc. The configuration record also includes information relating to DNS naming protocols. These parameters include domain name, list of DNS forwarders, etc.

The configuration record also includes application configuration information that allows various applications and services to be automatically configured. Time service parameters such as time zone, NTP servers, current GMT time, etc. allow the Internet access device to retrieve an accurate time over the Internet. Web mirroring service parameters allow the contents of the web site on the Internet access device to be automatically copied up to a location on the ISP for faster access by outside users. E-mail service parameters direct the Internet access device on where and how to connect for e-mail over the Internet. Upgrade service parameters allow the Internet access device to automatically receive software upgrades over the Internet. Backup services parameters allow the Internet access device to backup files to a secure location located on the Internet.

The configuration record may also include parameters related to a wide variety of other types of services. By way of example, parameters for configuring an electronic news service, an electronic banking service, an authentication service, or other services may also be included in the configuration record. In general, the configuration record may contain any parameters relating to a desired service that may be downloaded to configure the Internet access device automatically to enable it to use that service.

The flowchart of FIG. 12 demonstrates one possible embodiment by which the information in the configuration record may be used to automatically configure the Internet access device. In step 802 the link information is used to configure either the analog modem, the ISDN adapter, or the synchronous serial interface, depending upon which level of service the user has chosen. In step 804 the PPP information is used to configure the Internet access device for Point to Point Protocol. In step 806 the IP router 240 of the Internet access device is configured using the IP network information. In step 808 the domain name server 236 is configured using the DNS naming information. In step 810 the DHCP server is configured using the IP network information. In step 812 the time server is configured using the appropriate time application information.

In step 814 any subscriber information from the configuration record is stored to the hard disk drive 120. In step 816 the mail server is configured using appropriate mail service parameters. Next in step 818, any other additional applications that are present are configured using the appropriate application information from the configuration record. Once the above devices have been configured, then the Internet access device is ready to be enabled.

In step 820 the router 240, the domain name server 236, and the DHCP server 238 are enabled. Next, in step 822 the analog modem 104, the ISDN adapter 106, the synchronous serial interface 108, and the PPP connection 232 are all enabled. In step 824 the mail, web, time and other additional servers are all enabled. Finally customer information and a confirmation of enablement are sent to the ISP. After this step, the automatic configuration process is over.

Embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Examples of input/output devices usable by the present invention include those described above as well as video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Although the foregoing invention has been described in some detail for purposes of clarity of understanding, it will be apparent that certain changes and modifications may be practiced within the scope of the appended claims. For instance, the present invention is useful not only in the context of the Internet, but also with any type of internet or network. Also, in addition to the specific types of communications lines and protocols described, the present invention would be useful in configuring other lines as well. The present invention is advantageous for configuring a single host site, as well as local or wide area networks. In addition, the initial accessing and retrieval of configuration information from a configuration record may be performed by a device separate from the Internet access device which is finally configured for communication. Also, the configuration server may be located on the Internet, an internet, at the ISP, or in an isolated location that is not connected to the Internet. Therefore, the described embodiments should be taken as illustrative and not restrictive, and the invention should not be limited to the details given herein but should be defined by the following claims and their full scope of equivalents.

APPENDIX

1. Language Overview

The language is parsed in a way that is familiar to any shell, per, or C programmer. The basic rules are:

The input is separated into tokens which may be separated by arbitrary amounts of white space (i.e., space, tab, carriage return, newline, and form feed characters).

If the first character on a line is a hash sign ("#"), the entire line is ignored.

The file contains a sequence of commands, each of which must be terminated with a semi-colon.

Textual strings are contained in double quotes. Backslash escapes are used to escape the double quote character and any unprintable characters. The standard C escapes for tab, newline, etc. are supported, as well as octal (e.g., "\016") and hexadecimal (e.g., "\x0e") escapes.

Here is an example file that an ISP might use to configure a customer's Internet access device:

```
# Set the domain name and forwarding DNS servers
# Also turn on host address translation
domain "customer.isp.com";
forwarders 207.76.204.2 207.76.204.9;
enable host-addr-xlate;
# Time stuff
time-zone "America/Los_Angeles";
ntp-servers "tick.usno.navy.mil" "tock.usno.navy.mil";
# Configure customer's modem port for PPP dialup
# Enable dial-on-demand with a 20 minute timeout
port "Mod0"
{
  type modem
  {
    telno "456-7890";
    ppp
    {
      login "ppp-login";
      password "ppp-password";
    };
    dial-on-demand { timeout 1200; }; }; };
# Customer uses a fake IP address with host address translation
# They also want to turn on DHCP from 192.168.1.100 -- 192.168.1.200
local network "client"
{
  address 192.168.1.0/24;
  enable dhcp;
  dhcp min-host 100;
  dhcp max-host 200;
};
# Set IP addresses on customer WAN network (uses modem port)
local network "wan"
{
  port "Mod0";
  address 207.76.204.65/0;
  remote host 207.76.204.4;
};
# Do web mirroring to our web farm machine
web-mirror
{
```

-continued

```
  server "webfarm1.isp.com";
  login "cust-login";
  password "cust-password";
  path "/customer/webdocs";
  enable update "05:00";
};
# They can finger our mail server every hour to check for mail
mail-config
{
  enable finger "m38742@mailserv.isp.com";
  check-interval "1:00";
  disable stay-connected;
};
```

As is apparent from the above example, commands can be nested within other commands. Note also that semi-colons are required even after a closing brace.

2. Top Level Commands

The top level commands are described below. Where a string is required, double quotes are shown around the string argument.

domain "domain-name";
Sets the domain name for the Internet access device to the string domain-name, which must be a valid domain name.
forwarders [ ip-address . . . ];
Set the list of DNS forwarders to the IP addresses given.
workgroup "workgroup-name";
Sets the Microsoft networking workgroup name for the Internet access device to the contents of workgroup-name, which must be a valid workgroup name.
[ enable | disable ] host-addr-xlate;
Enable/disable host address translation.
gateway network "network-name" host host-number;
Sets the default route to be found at the IP address with host part host-number and network part the address of network network-name.
port "port-name" { port-commands };
Configure the port named port-name with the port commands listed between the braces; create the port if it doesn't already exist.
[ local | remote ] network "network-name" { network-commands };
Create/modify the local or remote network named network-name with the network commands listed between the braces.
machine "machine-name" { machine-commands };
Create/modify the machine named machine-name with the machine commands listed between the braces.
ref "machine-name" ip-address { ref-commands };
Create/modify the address reference ip-address for machine machine-name. The ip-address must be a valid IP address on some network in the database.
time-zone "zone-name";
Set the time zone to zone-name, which is a pathname relative to /usr/local/zoneinfo on a BSD Unix machine.
ntp-servers [ "server-name" . . . ];
Set the list of NTP servers. Each server-name is a string containing either a hostname or an IP address.
current-time-gmt [ "date-string" | seconds ];
Set the system clock, Greenwich mean time. The argument may either be a string, such as "Sun Oct 20 21:39:31 GMT 1996," or else a number expressing the total number of seconds since the Epoch (00:00:00 Jan. 1, 1970).
This command should not be included unless generated on the fly.
web-mirror { mirror-commands };
Configure web mirroring.
mail-config { mail-commands };
Configure mail.
organization { org-commands };
Configure organizational information.
upgrade { upgrade-commands };
Configure upgrade information.
isp-agent { isp-agent-commands };
Configure ISP related information.

3. Port Commands

The commands valid in a port statement are described below.

description "string"
Sets the description for the port to string. This should normally not be changed.
interface "if-name";
Sets the system interface for the port to if-name. This should normally not be changed.
device "dev-name";
Sets the system device for the port to dev-name. Some ports types require this. This should normally not be changed.
external [ yes | true | no | false ];
Sets/clears the external attribute for the port. This should normally not be changed.
enabled [ yes | true | no | false ];
Sets/clears the enabled attribute for the port. This should normally not be changed.
type [ ethernet | loopback | modem | raw-sync | frame-relay | cisco-hdlc | isdn-bri ]{ port-type-commands };
Sets the type of the port. The port-type-commands are commands that apply to that type of port (see below).

4. Port Type Commands

The valid port-type-commands are described below.
lmi-type [ ansi | itu | group-of-four ];
For frame relay ports, sets the LMI type to ANSI Annex D, ITU Annex A, or Group-of-Four (aka. Cisco-Stratacom), respectively.
telephone "number";
prefix "number";
port-speed value;
For modem and ISDN ports, sets the telephone number, dialing prefix, and serial port speed, respectively. The latter should normally not be changed.
speaker [ on | off ];
For modem ports, turns the speaker on or off while dialing.
bitrate value;
For synchronous port types, sets the synchronous bit rate.
dial-on-demand { dod-commands };
For modem and ISDN ports, configure dial-on-demand. Currently there is only one dial-on-demand command:
idle-timeout value;
This command sets the idle-timeout value in seconds, or if zero, disables idle-timeout (i.e., always stay connected).
ppp { ppp-commands };
For all port types except Cisco-HDLC, configures PPP. These are the valid PPP commands:
login "string";
password "string";
[ enable | disable ] proxy-arp;
The latter command is not normally used.
[ enable | disable ] ppp;
For frame relay ports, enable/disable RFC 1490 PPP over frame relay.

5. Network Commands

The commands valid in a network statement are described below. Note that every local network has an associated port; the port determines whether the network is point-to-point or not.
description "string";
Give a description of the network.

address ip-address/width;
Set the IP address of the network using a netmask of width width.
For point-to-point networks, the address is the address of the local end of the link and the width MUST be zero. Otherwise, the host part of the address (as determined by the netmask width) MUST be zero. If the width is omitted, the natural class A, B, or C width is assumed.
For PPP links, the address is used as a starting point for IPCP negotiation; if negotiated differenly, this address will be overridden. If the address is 255.255.255.255, then PPP will use the IP address of the Internet access device on the LAN network as a starting point.
remote host ip-address;
For point-to-point networks, set the IP address of the remote end of the link. If negotiated differenly by PPP, this address will be overridden.
[ enable | disable ] dhcp;
Enable/disable DHCP service for this network.
dhcp min-host host-number;
dhcp max-host host-number;
dhcp max-lease value-in-seconds
dhcp default-lease value-in-seconds;
Configure DHCP for this network.
dlci value;
For local networks that are connected to frame relay ports, sets the DLCI for this network.
6. Machine Commands
The commands valid in a machine statement are described below.
description "string"
Give a description of the machine.
hardware [ ether-address . . . ];
List the Ethernet addresses for the machine. Each address is a colon separated list of hexadecimal octets, e.g., "00:80:29:eb:75:9d."
names ["dns-name" . . . ];
Sets the DNS names associated with the machine.
7. Reference Commands
The commands valid in a ref statement are described below.
start [ "date-string" | seconds ];
expiry ["date-string" | seconds ];
timestamp [ "date-string" | seconds ];
Sets the DHCP lease start and expiration times, and the time the address was last seen in use on the network. Each time value is either a string, such as "Sun Oct 20 21:39:31 GMT 1996,"or else a number expressing the total number of seconds since the Epoch (00:00:00 Jan. 1, 1970). These should normally not be used.
unconfirmed [ yes | true | no | false ];
Sets the "unconfirmed" attribute of this reference. These should normally not be used.
names [ "dns-name" . . . ];
Sets the DNS names associated with the IP address.
8. Web Mirroring Commands
The commands valid in a web-mirror statement are:
server "host-or-ip";
login "string";
password "string";
path "directory";
Set the FTP server, login, password, and directory for web mirroring, respectively.
[enable | disable ] update [ "time" ];
Enable/disable daily updates at the specified time. The time is express in 24 hour time, e.g., "23:30".
9. Mail Configuration Commands
The commands valid in a mail-config statement are:
[ enable | disable ] stay-connected [ minutes];
Enable/disable staying connected for minutes minutes when trying to recieve mail.
[ enable | disable ] finger [ "account" ];
Enable/disable fingering account when receipt of mail is desired.
check-interval [ "time" ];
Check for mail every time hours and minutes, where time is expressed like "1:30" (to check for mail every hour and a half).
10. Organization Commands
The commands valid in an organization statement are:
name "string";
email "string";
address "string";
city "string";
state "string";
zip "string";
country "string";
telno "string";
fax "string";
note "string";
11. Upgrade Commands
The commands valid in an upgrade statement are:
server "string";
path "string";
These commands set the default URL that appears in the upgrade system page.
12.ISP Agent Commands
The commands valid in an isp-agent statement are:
name "string";
account-url "string";
support-url "string";
13. Special Names
Ports, networks, and machines are all known by simple printable names, maximum length seven characters. By convention, the following names have special meaning. All names beginning with any character other than an underscore are reserved by Whistle.
port "Eth0"
This is the (primary) Internet access device Ethernet port.
port "Mod0"
This is the Internet access device modem port.
port "Loop"
This is the Internet access device internal loopback port; it's configuration should never need to be altered.
network "client"
This is the primary Internet access device Ethernet network. This network must exist in the database.
machine "wg"
The Internet access device itself. This machine must exist in the database.

We claim:

1. A computer-implemented method of automatically configuring an access device for communication with a communications network, said method comprising the steps of:
  connecting said access device to a configuration server;
  sending a customer account identifier from the access device to the configuration server;
  requesting that said configuration server return a configuration record identified by said customer account identifier, said configuration record containing configuration information for said access device;
  downloading said configuration record from said configuration server to said access device; and
  configuring said access device for communication with said communications network using said configuration information of said configuration record, wherein said step of configuring said access device includes the sub-steps of:

configuring one selected from the group of a modem, an ISDN adapter, and a synchronous serial interface; and configuring a router of said access device.

2. A computer-implemented method of automatically configuring an access device for communication with a communications network, wherein said access device is connected to a local area network (LAN), said method comprising the steps of:

connecting said access device to a configuration server;

sending a customer account identifier from the access device to the configuration server;

requesting that said configuration server return a configuration record identified by said customer account identifier, said configuration record containing configuration information for said access device;

downloading said configuration record from said configuration server to said access device; and configuring said access device for communication with said communications network using said configuration information of said configuration record, wherein said step of configuring said access device includes the sub-step of configuring said LAN for communication with said communications network.

3. A computer-implemented method of automatically configuring an access device for communication with a communications network, wherein said access device connects to a local area network (LAN), said method comprising the steps of:

connecting said access device to a configuration server over a communications network;

sending a customer account identifier from the access device to the configuration server;

requesting that said configuration server return a configuration record identified by said customer account identifier, said configuration record containing configuration information for said access device;

downloading said configuration record from said configuration server to said access device;

configuring said access device for communication with said communications network using said configuration information of said configuration record, wherein said step of configuring said access device includes the sub-steps of:

assigning a static address to a router included in said access device; and assigning a static address to each of a plurality of end hosts present on said LAN, and accessing said communications network using said access device.

4. A computer-implemented method of automatically configuring an access device for communication with a communications network, wherein said access device connects to a local area network (LAN), said method comprising the steps of:

connecting said access device to a configuration server over a communications network;

sending a customer account identifier from the access device to the configuration server;

requesting that said configuration server return a configuration record identified by said customer account identifier, said configuration record containing configuration information for said access device;

downloading said configuration record from said configuration server to said access device;

configuring said access device for communication with said communications network using said configuration information of said configuration record, wherein said step of configuring said access device includes the sub-step of configuring said LAN for communication with said communications network; and accessing said communications network using said access device.

5. A computer-implemented method of automatically configuring an access device for communication with a communications network, said method comprising the steps of:

connecting said access device to a configuration server;

sending a customer account identifier from the access device to the configuration server;

requesting that said configuration server return a configuration record identified by said customer account identifier, said configuration record containing configuration information for said access device;

downloading said configuration record from said configuration server to said access device; and configuring said access device for communication with said communications network using said configuration information of said configuration record, wherein said access device is for use as a router in said communications network, wherein said accessing step uses a temporary dynamic address for said access device, wherein said configuration server is located on said communications network, wherein said configuration information includes a static address for said access device, wherein said downloading step uses said temporary dynamic address, and wherein said step of configuring said access device for communication includes a step of assigning said static address to said access device.

6. A method as recited in claim 5 wherein said step of accessing is performed using a modem over an analog communications line.

7. A method as recited in claim 6 wherein said step of configuring said access device configures said access device for communication over a line selected from the group consisting of an analog communication line, a high-speed leased telephone line and a digital communications line.

8. A method as recited in claim 5 further including the step of receiving by said access device a registration identification number that includes said customer account identifier and an identifying address for said configuration server.

9. A method as recited in claim 8 further including the steps of:

verifying that said received registration identification number is valid; and wherein when it is determined that said received registration identification number is valid, initiating said step of accessing said communications network.

10. A method as recited in claim 9 further including the step of decoding said received registration identification number into said customer account identifier and said identifying address.

11. A method as recited in claim 8 wherein said registration identification number further includes a check sum for verifying that said registration identification number is valid.

12. A method as recited in claim 5 wherein said configuration record includes a range of static addresses for use by a local area network (LAN) connected to said access device.

13. A method as recited in claim 5 wherein said access device is connected to a local area network (LAN) and said step of configuring said access device includes the sub-step of configuring said LAN for communication with said communications network.

14. A computer program product comprising a computer-usable medium having computer-readable program code embodied thereon for automatically configuring an access device for communication with a communications network, said computer program product comprising computer-readable program code for effecting the following steps within a computer system:

connecting said access device to a configuration server;

sending a customer account identifier from the access device to the configuration server;

requesting that said configuration server return a configuration record identified by said customer account identifier, said configuration record containing configuration information for said access device;

downloading said configuration record from said configuration server to said access device;

configuring said access device for communication with said communications network using said configuration information of said configuration record;

configuring said access device as a router in said communications network using a temporary dynamic address for said access device;

downloading configuration information, which includes a static address for said access device, using said temporary dynamic address; and assigning said static address to said access device.

15. An access device for use in communicating with an internet said access device comprising:

a central processing unit;

a memory device coupled to said central processing unit;

input means coupled to said central processing unit for inputting information from a user;

output means coupled to said central processing unit for presenting information to a user;

a communication means for communicating with said internet using a dynamic address of said access device, said communication means able to access and communicate with said internet without receiving configuration information from said internet;

automatic configuration means for accepting a configuration server address and a customer account identifier and for automatically retrieving, using said customer account identifier, configuration information associated with said customer account identifier from a configuration server located on said internet at said configuration server address, said automatic configuration means being arranged to configure said access device using said configuration information such that said access device is configured using a static address included in said configuration information and said communication means is then arranged to access and communicate with said internet using said static address as an address of said access device; and a router for routing information received from said internet to a local area network (LAN) connected to said access device, said router initially configured as having a temporary dynamic address and being arranged to be configured as having a static address.

16. An access device for use in communicating with an internet, said access device comprising:

a central processing unit:

a memory device coupled to said central processing unit;

input means coupled to said central processing unit for inputting information from a user;

output means coupled to said central processing unit for presenting information to a user;

a communication means for communicating with said internet using a dynamic address of said access device, said communication means able to access and communicate with said internet without receiving configuration information from said internet;

automatic configuration means for accepting a configuration server address and a customer account identifier and for automatically retrieving, using said customer account identifier, configuration information associated with said customer account identifier from a configuration server located on said internet at said configuration server address, said automatic configuration means being arranged to configure said access device using said configuration information such that said access device is configured using a static address included in said configuration information and said communication means is then arranged to access and communicate with said internet using said static address as an address of said access device; and a router for routing information received from said internet to a local area network (LAN) connected to said access device, said router initially being configured as having a temporary dynamic address and being arranged to be configured to have a static address, wherein the output means comprises a display and wherein the communication means is a modem for communicating with said internet using an analog communications line.

* * * * *